(12) United States Patent
Yamamoto et al.

(10) Patent No.: US 12,381,766 B2
(45) Date of Patent: *Aug. 5, 2025

(54) COMMUNICATION APPARATUS AND TRANSMISSION METHOD FOR TRANSMITTING A DEMODULATION REFERENCE SIGNAL

(71) Applicant: Panasonic Intellectual Property Corporation of America, Torrance, CA (US)

(72) Inventors: Tetsuya Yamamoto, Kanagawa (JP); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,551

(22) Filed: May 13, 2024

(65) Prior Publication Data

US 2024/0297812 A1    Sep. 5, 2024

Related U.S. Application Data

(63) Continuation of application No. 18/302,584, filed on Apr. 18, 2023, now Pat. No. 12,015,512, which is a (Continued)

(30) Foreign Application Priority Data

Feb. 5, 2016   (JP) .................................. 2016-020934

(51) Int. Cl.
*H04L 27/26* (2006.01)
*H04L 1/00* (2006.01)
(Continued)

(52) U.S. Cl.
CPC ...... *H04L 27/26132* (2021.01); *H04L 1/0003* (2013.01); *H04L 1/0013* (2013.01);
(Continued)

(58) Field of Classification Search
None
See application file for complete search history.

(56) References Cited

U.S. PATENT DOCUMENTS 10,924,234 B2   2/2021  Yamamoto et al.
11,533,210 B2  12/2022  Yamamoto et al.
(Continued)

FOREIGN PATENT DOCUMENTS

EP         3331298 A1      6/2018
WO   WO-2014110924 A1 *   7/2014   ........... H04L 1/0053
(Continued)

OTHER PUBLICATIONS

ETRI, "Uplink DMRS design for NB-Iot," R1-160125, Agenda Item: 2.1.2.1, 3GPP TSG RAN WG1 NB-LoT Ad-Hoc Meeting, Budapest, Hungary, Feb. 18-20, 2016, 3 pages.
(Continued)

*Primary Examiner* — Jay L Vogel
(74) *Attorney, Agent, or Firm* — Seed IP Law Group LLP

(57) ABSTRACT

A repetition unit (212) performs a repetition for mapping a data signal and a demodulation reference signal (DMRS) repeatedly at a symbol level over a plurality of subframes. A signal allocation unit (213) maps, in the a plurality of subframes, the repeated DMRS to symbols other than symbols corresponding to an SRS resource candidate, which is a candidate for a resource to which a sounding reference signal (SRS) to be used to measure an uplink received signal quality is to be mapped. A transmission unit (216) transmits an uplink signal (PUSCH) including the DMRS and the data signal over the a plurality of subframes.

12 Claims, 13 Drawing Sheets

Related U.S. Application Data continuation of application No. 17/990,422, filed on Nov. 18, 2022, now Pat. No. 11,665,039, which is a continuation of application No. 17/145,811, filed on Jan. 11, 2021, now Pat. No. 11,533,210, which is a continuation of application No. 16/064,971, filed as application No. PCT/JP2016/086556 on Dec. 8, 2016, now Pat. No. 10,924,234.

(51) Int. Cl.
| | |
|---|---|
| H04L 1/08 | (2006.01) |
| H04L 1/1829 | (2023.01) |
| H04L 5/00 | (2006.01) |
| H04L 25/02 | (2006.01) |
| H04W 72/04 | (2023.01) |
| H04W 72/0446 | (2023.01) |
| H04W 72/20 | (2023.01) |
| H04W 72/21 | (2023.01) |
| H04W 72/23 | (2023.01) |

(52) U.S. Cl.
CPC .............. *H04L 1/08* (2013.01); *H04L 1/1861* (2013.01); *H04L 5/0048* (2013.01); *H04L 5/0051* (2013.01); *H04L 5/0053* (2013.01); *H04L 5/0094* (2013.01); *H04L 25/0224* (2013.01); *H04L 25/0228* (2013.01); *H04L 27/26* (2013.01); *H04L 27/2607* (2013.01); *H04L 27/2613* (2013.01); *H04L 27/2626* (2013.01); *H04W 72/04* (2013.01); *H04W 72/0446* (2013.01); *H04W 72/20* (2023.01); *H04W 72/21* (2023.01); *H04W 72/23* (2023.01); *H04L 5/005* (2013.01); *H04L 27/2636* (2013.01)

(56) References Cited

U.S. PATENT DOCUMENTS

| | | | |
|---|---|---|---|
| 2012/0014425 A1 | 1/2012 | Zhuang et al. | |
| 2013/0114756 A1* | 5/2013 | Jia | H04L 5/0048 |
| | | | 375/295 |
| 2013/0272233 A1 | 10/2013 | Dinan | |
| 2014/0126510 A1 | 5/2014 | Ogawa et al. | |
| 2014/0286255 A1* | 9/2014 | Nam | H04L 27/2636 |
| | | | 370/329 |
| 2015/0373694 A1* | 12/2015 | You | H04L 5/0051 |
| | | | 370/329 |
| 2016/0007323 A1 | 1/2016 | Suzuki et al. | |
| 2016/0337157 A1* | 11/2016 | Papasakellariou | H04L 1/1893 |
| 2017/0201362 A1 | 7/2017 | Park et al. | |
| 2017/0214442 A1 | 7/2017 | Chae et al. | |
| 2017/0251497 A1 | 8/2017 | Larsson et al. | |
| 2018/0145802 A1 | 5/2018 | Hwang et al. | |
| 2018/0359067 A1 | 12/2018 | Kim et al. | |
| 2019/0014561 A1 | 1/2019 | Takeda et al. | |
| 2019/0037554 A1 | 1/2019 | Gao et al. | |
| 2019/0068334 A1* | 2/2019 | Stern-Berkowitz | H04L 1/1822 |

FOREIGN PATENT DOCUMENTS

| | | | | |
|---|---|---|---|---|
| WO | 2016161619 A1 | 10/2016 | | |
| WO | WO-2017026975 A1 * | 2/2017 | ........... | H04L 5/0007 |

OTHER PUBLICATIONS

Qualcomm Incorporated, "UL Data Channel Design," R1-160107, Agenda Item: 2.1.2.1, 3GPP TSG-RAN WG1 NB- IoT, Jan. 18-20, 2016, Budapest, Hungary, 5 pages.
3GPP TS 36.211 V13.0.0, "3rd Generation Partnership Project; Technical Specification Group Radio Access Network; Evolved Universal Terrestrial Radio Access (E-UTRA); Physical channels and modulation (Release 13)," Dec. 2015.
3GPP TS 36.212 V13.0.0, "3rd Generation Partnership Project; Technical Specification Group Radio Access Network; Evolved Universal Terrestrial Radio Access (E-UTRA); Multiplexing and channel coding (Release 13)," Dec. 2015.
3GPP TS 36.213 V13.0.0, "3rd Generation Partnership Project; Technical Specification Group Radio Access Network; Evolved Universal Terrestrial Radio Access (E-UTRA); Physical layer procedures (Release 13)," Dec. 2015.
3GPP TSG RAN Meeting #69, RP-151621, Qualcomm Incorporated, "New Work Item: NarrowBand IOT (NB-IOT)," Sep. 14-16, 2015.
3GPP TSG RAN WG1 #80, R1-150350, Samsung, "Transmission of UL Control Channels for Rel-13 Low Cost UEs," Feb. 9-13, 2015.
3GPP TSG RAN WG1 IN-IoT Ad-Hoc Meeting, R1-160061, Panasonic, "NB-IoT Pusch link level evaluation," Jan. 18-20, 2016.
3GPP TSG RAN WG1 Meeting #80, R1-150312, Panasonic, "Discussion and performance evaluation on PUSCH coverage enhancement," Feb. 9-13, 2015.
3GPP TSG RAN WG1 Meeting #80bis, R1-151587, Samsung, "Considerations of legacy SRS impact on uplink transmission from low-cost UE," Apr. 20-24, 2015.
3GPP TSG RAN WG1 Meeting #81, R1-152703, LG Electronics, "Discussion on PUSCH transmissions for MTC," May 25-29, 2015.
3GPP TSG RAN WG1 NB-IoT Ad-Hoc Meeting, R1-160183, Huawei, HiSilicon, China Telecom, "Uplink frame structure design," Jan. 18-20, 2016.
Extended European Search Report, dated Jan. 17, 2019 for European Patent Application No. 16889410.3.
Indian Examination Report, dated Oct. 7, 2021, for Indian Patent Application No. 201847024880.
International Search Report of PCT application No. PCT/JP2016/086556, dated Feb. 14, 2017.
U.S. Appl. No. 62/212,684, filed Sep. 1, 2015, Papasakellariou.
U.S. Appl. No. 62/278,975, filed Jan. 14, 2016, Hwang.

* cited by examiner

FIG. 2

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0,1} |
| 8 | 1000 | 5 | {2,3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0,1,2,3,4,6,8} |
| 14 | 1110 | 10 | {0,1,2,3,4,5,6,8} |
| 15 | 1111 | reserved | reserved |

COMMUNICATION APPARATUS AND TRANSMISSION METHOD FOR TRANSMITTING A DEMODULATION REFERENCE SIGNAL

TECHNICAL FIELD

The present disclosure relates to a terminal and a transmission method.

BACKGROUND ART

In recent years, a promising mechanism for supporting the future information society is machine-to-machine (M2M) communication, which realizes a service by autonomous communication between machines, without involving user judgment. A smart grid is an example of a specific applied case of an M2M system. A smart grid is an infrastructure system that efficiently supplies a lifeline such as electricity or gas. For example, on a smart grid, M2M communication is performed between smart meters installed in each home or each building, and a central server, and the demand balance of resources is adjusted autonomously and efficiently. Other examples of an applied case of an M2M communication system include monitoring systems for product management, environment sensing, telemedicine, and the like, remote management of the stocking and charging of vending machines, and the like.

In M2M communication systems, the use of cellular systems having a particularly wide communication area is being focused on. In 3GPP, an M2M-focused cellular network advancement called NarrowBand Internet of Things (NB-IoT) is being standardized (for example, see NPL 4), and the specifications are being considered to meet the demands of lower-cost terminals, reduced power consumption, and coverage enhancement. In particular, unlike handset terminals which are often used by users while moving, for terminals such as smart meters with little to no motion, securing coverage is an absolutely necessary condition for providing a service. For this reason, to accommodate the case in which a terminal is disposed in a location which is unusable in the communication areas of existing cellular networks (for example, LTE and LTE-Advanced), such as the basement of a building, coverage enhancement to further expand the communication area is an important issue under consideration.

Whereas existing LTE resource blocks are made up of 12 subcarriers, to expand the communication area while reducing power consumption of the terminal (hereinafter also called an NB-IoT terminal), the NB-IoT uplink supports transmission on numbers of subcarriers which are less than 12 (for example, 1, 3, and 6 subcarriers). By having a terminal transmit on fewer subcarriers (in other words, transmit on a narrower band), the power spectral density increases, thereby improving the receiver sensitivity and expanding coverage.

In the case in which a terminal transmits on a number of subcarriers less than 12 subcarriers, if resources are allocated to the terminal every 1 subframe, which is the existing unit of time for LTE resource blocks, the number of resource elements (REs) which may be allocated to the terminal at one time is reduced. For example, supposing the PUSCH of existing LTE as illustrated in FIG. 1, in the case in which the terminal transmits on 12 subcarriers, 12 (SC-FDMA symbols)×12 (subcarriers)=144 REs may be allocated for data transmission. On the other hand, in the case in which the terminal transmits on 1 subcarriers, 12 (SC-FDMA symbols)×1 (subcarrier)=12 REs are allocated for data transmission. In the case in which data with the same transport block size is transmitted, the code rate increases with fewer REs. Also, to maintain the same code rate, it is necessary to reduce the transport block size, but overhead such as header information and the cyclic redundancy check (CRC) becomes larger with respect to the data size.

In NB-IoT, to keep the number of REs which may be allocated to a terminal at one time to the same degree as the existing LTE, the number of allocable subframes is increased in accordance with the number of transmission subcarriers. For example, the units of resources to allocate at one time (hereinafter designated scheduling units or resource units) are taken to be 8 subframes in the case of a terminal transmitting on 1 subcarrier, 4 subframes in the case of a terminal transmitting on 3 subcarriers, and 2 subframes in the case of a terminal transmitting on 6 subcarriers.

In NB-IoT, coverage enhancement of up to approximately 20 dB compared to an LTE communication area is demanded. In transmission on fewer than 12 subcarriers as described above, for example, in the case of a terminal transmitting on M subcarriers, a coverage improvement of $10 \log_{10}(12/M)$ dB compared to the case of transmitting on 12 subcarriers is anticipated theoretically. For example, in the case of 1 subcarrier transmission, the coverage may be improved by up to approximately 11 dB compared to LTE transmission on 12 subcarriers. However, to realize the 20 dB coverage improvement demanded by NB-IoT, in addition to 1 subcarrier transmission, the application of additional coverage-improving technology is essential.

Accordingly, to enhance coverage, the introduction of repetition technology, which repeatedly transmits the same signal on the transmitting side, and combines the signals on the receiving side to improve the receiver sensitivity and enhance coverage, is being considered.

Furthermore, the NB-IoT terminals needing coverage enhancement have little to no motion, and by focusing on the supposition of an environment without channel variation over time, the use of technology for improving the channel estimation accuracy is also being considered.

One example of technology for improving the channel estimation accuracy is "a plurality of subframe channel estimation and symbol level combining" (for example, see NPL 5). With a plurality of subframe channel estimation and symbol level combining, as illustrated in FIG. 4, for a signal transmitted by repetition over a plurality of subframes (R subframes), the base station performs coherent combining at the symbol level over a number of subframes equal to the number of repetitions or a number of subframes less than the number of repetitions (X subframes). After that, the base station performs channel estimation using the coherently combined DMRS, and uses the obtained channel estimation result to perform demodulation/decoding of the SC-FDMA data symbols.

In the case in which the units for performing a plurality of subframe channel estimation and symbol level combining, namely the number of subframes (X), is less than the number of repetitions (R), the base station combines (R/X) symbols after demodulation and decoding.

By using a plurality of subframe channel estimation and symbol level combining, the PUSCH transmission quality may be improved compared to simple repetition that performs channel estimation and the demodulation/decoding of SC-FDMA data symbols at the subframe level (for example, see NPL 5).

CITATION LIST

Non Patent Literature

NPL 1: 3GPP TS 36.211 V13.0.0, "Evolved Universal Terrestrial Radio Access (E-UTRA); Physical channels and modulation (Release 13)," December 2015.

NPL 2: 3GPP TS 36.212 V13.0.0, "Evolved Universal Terrestrial Radio Access (E-UTRA); Multiplexing and channel coding (Release 13)," December 2015.

NPL 3: 3GPP TS 36.213 V13.0.0, "Evolved Universal Terrestrial Radio Access (E-UTRA); Physical layer procedures (Release 13)," December 2015.

NPL 4: RP-151621, Qualcomm, "New Work Item: Narrow-Band IoT (NB-IoT)"

NPL 5: R1-150312, Panasonic, "Discussion and performance evaluation on PUSCH coverage enhancement"

NPL 6: R1-151587, Samsung, "Considerations of legacy SRS impact on uplink transmission from low-cost UE," April 2015

NPL 7: R1-152703, LG Electronics, "Discussion on PUSCH transmission for MTC," May 2015

SUMMARY OF INVENTION

In a cell that supports NB-IoT terminals, it is necessary to accommodate the coexistence of NB-IoT terminals and existing LTE terminals, and it is desirable to improve the transmission quality for NB-IoT terminals while minimizing the impact on the existing LTE system.

An aspect of the present disclosure provides a terminal and a transmission method capable of improving the transmission quality for NB-IoT terminals while minimizing the impact on an existing LTE system.

A terminal according to an aspect of the present disclosure adopts a configuration including: a repetition unit that performs a repetition for mapping a data signal and a demodulation reference signal (DMRS) repeatedly at a symbol level over a plurality of subframes; a signal allocation unit that maps, in the a plurality of subframes, the repeated DMRS to symbols other than symbols corresponding to an SRS resource candidate, which is a candidate for a resource to which a sounding reference signal (SRS) used to measure an uplink received signal quality is to be mapped; and a transmission unit that transmits an uplink signal including the DMRS and the data signal in the a plurality of subframes.

It should be noted that general or specific embodiments may be implemented as a system, a method, an integrated circuit, a computer program, a storage medium, or any selective combination thereof.

According to an aspect of the present disclosure, it is possible to improve the transmission quality for NB-IoT terminals while minimizing the impact on an existing LTE system.

Additional benefits and advantages according to an aspect of the present disclosure will become apparent from the specification and the drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 2 is a diagram illustrating an example of an srs-SubframeConfig definition.

DESCRIPTION OF EMBODIMENTS

[SRS Resource Candidates in LTE]

First, resource candidates in LTE will be described.

In 3rd Generation Partnership Project Long Term Evolution (3GPP LTE), orthogonal frequency-division multiple access (OFDMA) is adopted as the downlink communication method from a base station (also called an eNB) to a terminal (user equipment (UE)), while single-carrier frequency-division multiple access (SC-FDMA) is adopted as the uplink communication method from a terminal to a base station (for example, see NPL 1 to 3).

Figure 1:
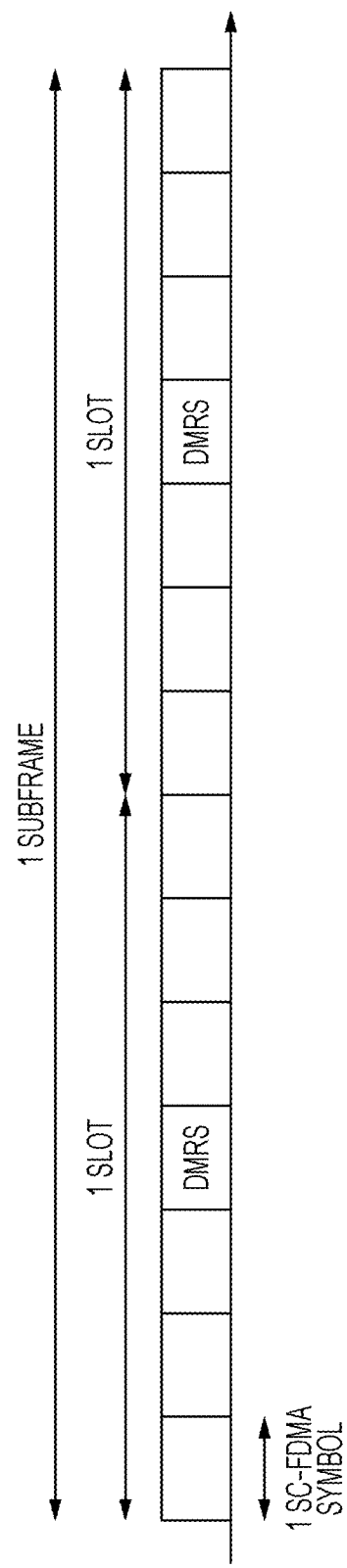
FIG. 1 is a diagram illustrating an example of a PUSCH subframe configuration.

In LTE, communication is performed by having the base station allocate resource blocks (RBs) inside the system band to terminals per a unit of time called a subframe. FIG. 1 illustrates an exemplary configuration of a subframe in the physical uplink shared channel (PUSCH) of LTE. As illustrated in FIG. 1, a single subframe contains two time slots. In each slot, a plurality of SC-FDMA data symbols and a demodulation reference signal (DMRS) are time-multiplexed. The base station receives the PUSCH, and uses the DMRS to perform channel estimation. After that, the base station uses the channel estimation result to perform demodulation/decoding of the SC-FDMA data symbols.

Also, on the LTE uplink, for measure the received signal quality between the base station and the terminal, a sounding reference signal (SRS) is used (for example, see NPL 1, 3). The SRS is mapped to SRS resources, and transmitted from the terminal to the base station. Herein, by a cell-specific higher-layer indication, the base station sets an SRS resource candidate group that includes SRS resource candidates shared among all terminals existing inside the target cell. After that, by a terminal-specific higher-layer indication, SRS resources in a subset of the SRS resource candidate group are allocated to each terminal to be allocated with SRS resources. A terminal maps the SRS to the allocated SRS resources, and transmits to the base station. Note that each SRS resource candidate is the last symbol in a subframe acting as an SRS transmission candidate (SRS transmission candidate subframe). Also, with regard to the symbols that act as SRS resource candidates, no terminals inside the cell in which the SRS resource candidate group is set perform data transmission, thereby preventing collisions between the SRS and a data signal (PUSCH signal).

Figure 3:
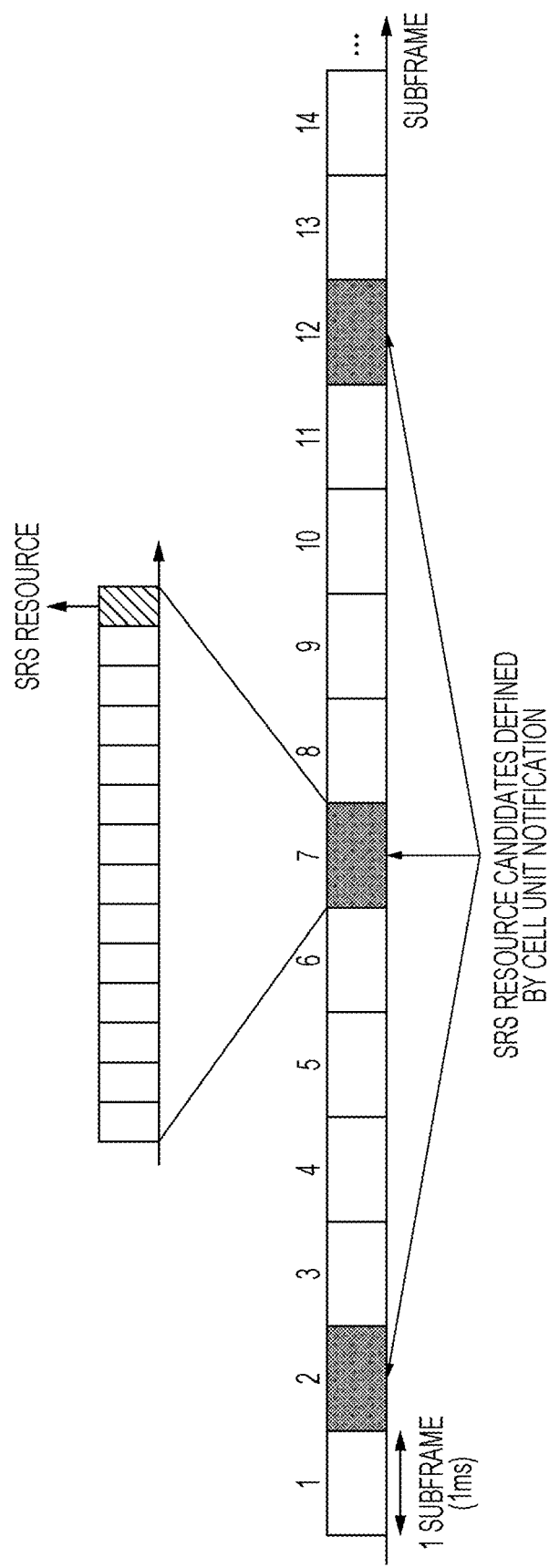
FIG. 3 is a diagram illustrating an exemplary setting of SRS transmission candidate subframes and SRS resources.
Figure 4:
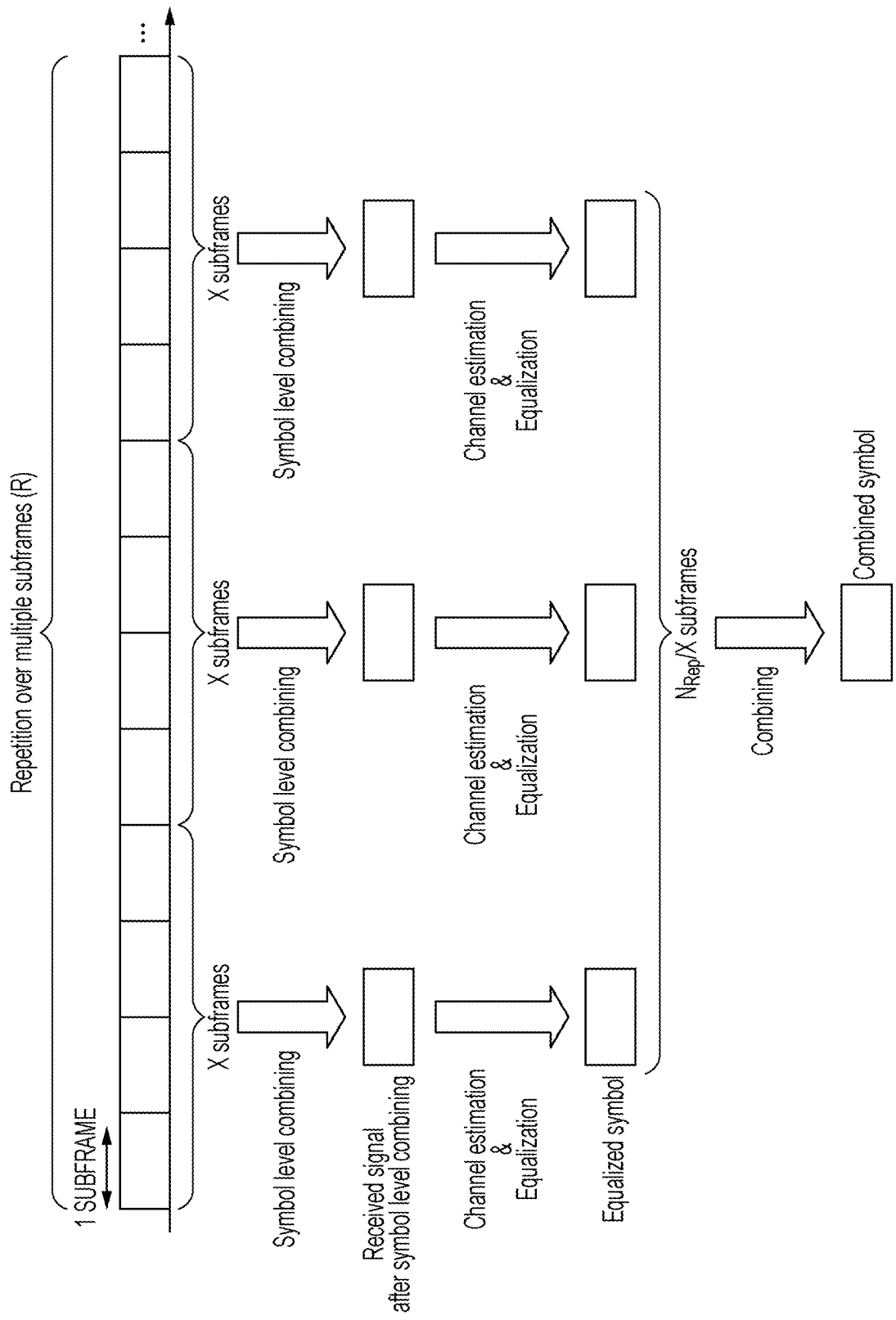
FIG. 4 is a diagram illustrating exemplary operations of a plurality of subframe channel estimation and symbol level combining.

In LTE, srs-SubframeConfig and the like is defined as a cell-specific higher-layer indication that sets the SRS resource candidate group (for example, see NPL 1). FIG. 2 illustrates an example of srs-SubframeConfig definitions. One of the srs-SubframeConfig numbers (from 0 to 15) illustrated in FIG. 2 is transmitted from the base station to the terminal. With this arrangement, a transmission interval ($T_{SFC}$) at which to transmit the SRS and an offset ($\Delta_{SFC}$) for indicating the subframe in which to start transmission of the SRS are indicated from the base station to the terminal. For example, in FIG. 2, in the case in which the srs-SubframeConfig number is 4 (Binary=0100), the transmission interval $T_{SFC}$=5, and the offset $\Delta_{SFC}$=1. In this case, the 2nd (=1+$\Delta_{SFC}$), the 7th (=1+$\Delta_{SFC}$+($T_{SFC}$×1)), the 12th (=1+$\Delta_{SFC}$+($T_{SFC}$×2)), and so on to the nth (1+$\Delta_{SFC}$+($T_{SFC}$×n)) subframes become SRS transmission candidate subframes (for example, see FIG. 3).

Background Leading Up to Present Disclosure

Next, the background leading up to the present disclosure will be described.

As described above, in NB-IoT, a terminal transmits on a number of subcarriers less than 12 subcarriers and in a number of subframes greater than 1 subframe as a single resource allocation unit (resource unit). Furthermore, to improve coverage, repetition for repeatedly transmitting the same signal a plurality of times is applied. In other words, in the time domain, provided that X is the number of subframes per resource unit, and R is the number of repetitions, (X×R) subframes are used for transmission.

As for the method of repeating resource units a plurality of times, the three methods indicated below are conceivable.

Figure 5:
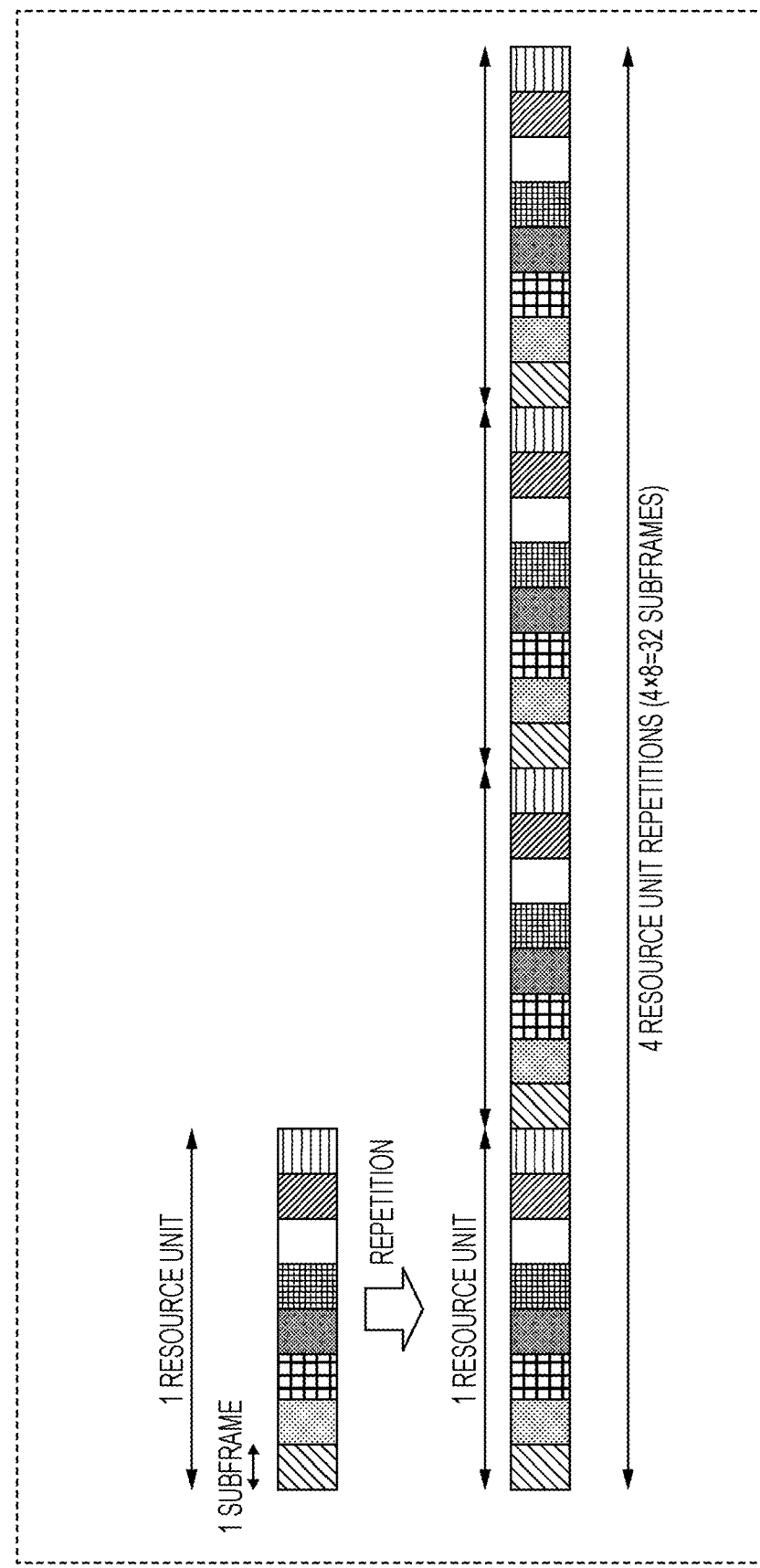
FIG. 5 is a diagram illustrating exemplary operations of repetition at the resource unit level.

The first is repetition at the resource unit level. FIG. 5 illustrates an example of repetition at the resource unit level (the case of X=8 and R=4).

Figure 6:
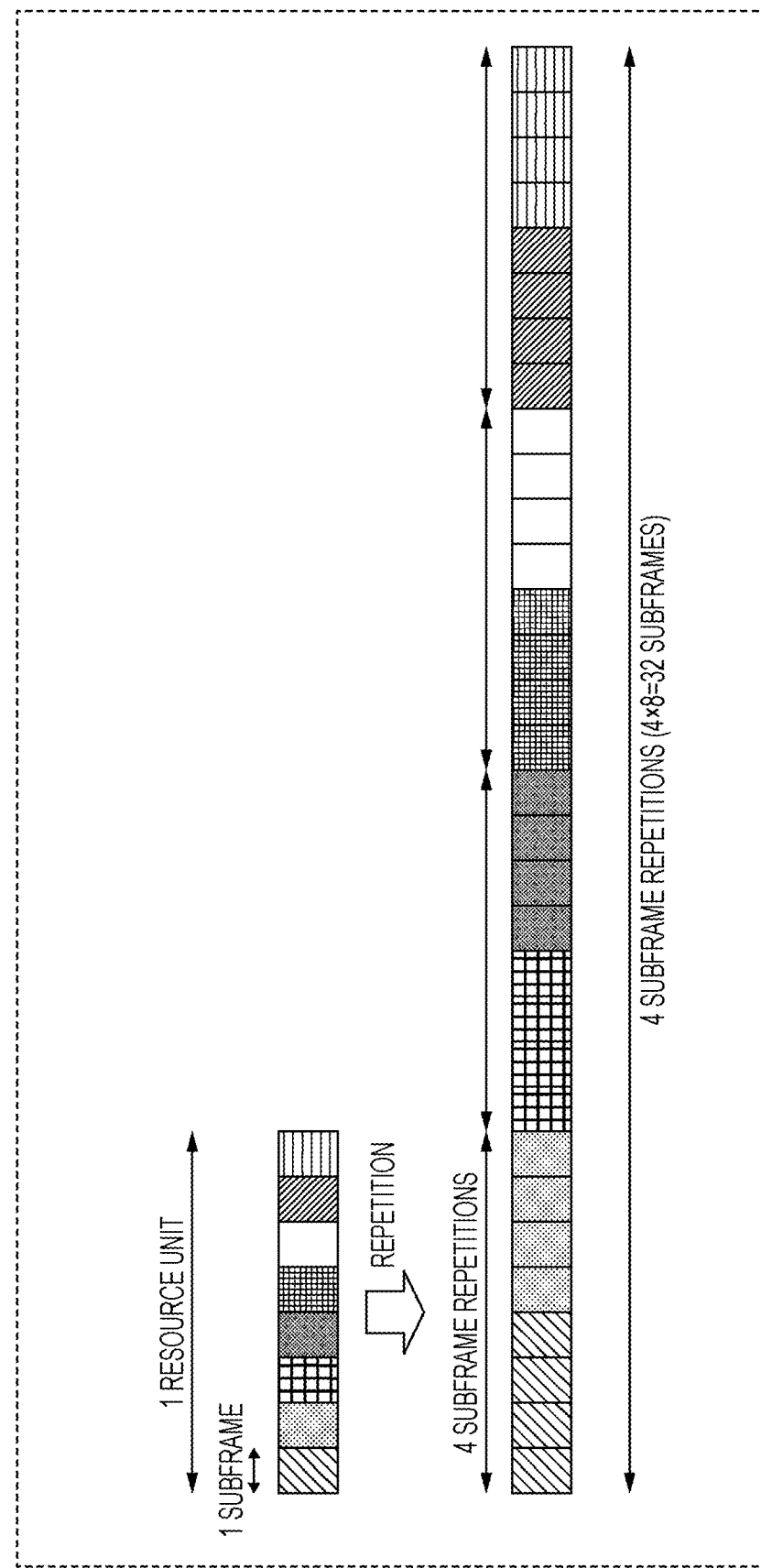
FIG. 6 is a diagram illustrating exemplary operations of repetition at the subframe level.

The second is repetition at the subframe level. With repetition at the subframe level, the terminal transmits a subframe signal including the same signal inside the resource unit in consecutive subframes. FIG. 6 illustrates an example of repetition at the subframe level (the case of X=8 and R=4). With repetition at the subframe level, since a subframe signal including the same signal is transmitted in consecutive subframes, compared to repetition at the resource unit level, signals are less susceptible to frequency error, and the symbol level combining described above is easy to apply.

Figure 7:
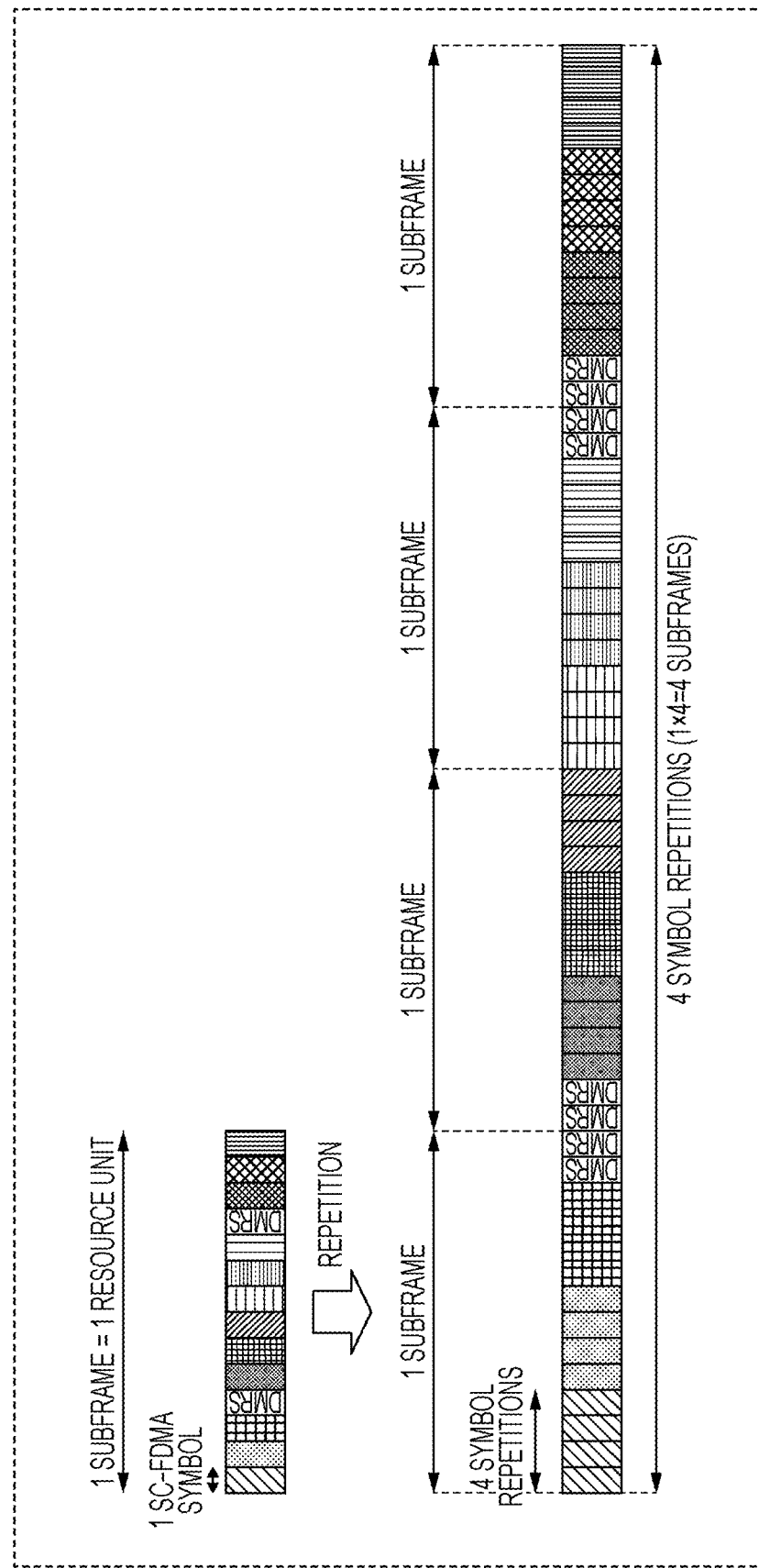
FIG. 7 is a diagram illustrating exemplary operations of repetition at the symbol level.

The third is repetition at the symbol level. With repetition at the symbol level, the terminal transmits single-carrier frequency-division multiple access (SC-FDMA) symbols including the same signal inside the resource unit in consecutive symbols. FIG. 7 illustrates an example of repetition at the symbol level (the case of X=1 and R=4). Note that in FIG. 7 and the following description, for the sake of simplicity, the case in which the number of subframes per resource unit is X=1 is illustrated as an example. With repetition at the symbol level, since symbols including the same signal are transmitted consecutively, compared to repetition at the subframe level, signals are even less susceptible to frequency error, and the effect of coverage improvement due to symbol level combining is greater.

Meanwhile, in NB-IoT, three operating modes are prescribed, namely a "Standalone mode" that uses the Global System for Mobile communications (GSM®) frequency band, a "Guard-band mode" that uses an unused frequency band provided to prevent interference with a separate system utilizing an adjacent frequency band in LTE, and an "In-band mode" that uses a portion of the existing LTE frequency band.

In the In-band mode, in a cell that supports NB-IoT terminals, it is necessary to accommodate the coexistence of existing LTE terminals and NB-IoT terminals, and it is desirable to support NB-IoT terminals so as to minimize the impact on the existing LTE system. For this reason, in the uplink transmission of NB-IoT terminals, it is necessary to prevent collisions with the SRS, which has the possibility of being transmitted over the entire system band by existing LTE terminals.

In the PUSCH transmission of an LTE system, the following two methods exist as the format by which an LTE terminal transmits data in an SRS transmission candidate subframe. The first method is a method that punctures the last symbol after mapping data to 12 SC-FDMA symbols excluding the DMRS, similarly to other subframes as illustrated in FIG. 1 (for example, see NPL 6). The second method is a method (rate matching) of mapping data to 11 SC-FDMA symbols excluding the last symbol while changing the code rate for the data from other subframes as the format of transmitting data in an SRS transmission candidate subframe (for example, see NPL 7).

Both of the two methods described above presuppose the PUSCH subframe configuration of existing LTE as illustrated in FIG. 1, or in other words, that the last symbol of a single subframe made up of 14 symbols is always a data symbol.

Among the repetition methods described above, with repetition at the resource unit level (see FIG. 5) and repetition at the subframe level (see FIG. 6), the PUSCH subframe configuration of existing LTE may be maintained, thereby making it possible to avoid collisions with the SRS of existing LTE due to puncturing the last symbol of a single subframe or rate matching. However, with the repetition at the resource unit level and repetition at the subframe level, the effects of symbol level combining may not be obtained sufficiently.

On the other hand, with repetition at the symbol level (see FIG. 7) in which the effects of symbol level combining are obtained sufficiently, the last symbol of a single subframe made up of 14 symbols is not necessarily a data symbol. For example, in the example illustrated in FIG. 7, the last symbol of the first and third subframes is the DMRS. Thus, in the case in which these subframes are SRS transmission candidate subframes, an NB-IoT terminal must puncture the DMRS mapped to the last symbol similar to existing LTE. Note that since the DMRS is not coded like the data, rate matching cannot be applied to the DMRS.

However, improvements in channel estimation accuracy are essential, particularly in environments where coverage enhancement is required, and it is desirable to avoid puncturing the DMRS. On the other hand, it is also conceivable to set the SRS subframe on the base station side so that the NB-IoT terminal avoids subframes that transmit the DMRS in the last symbol, but this setting limits the operation of existing LTE.

Accordingly, one aspect of the present disclosure minimizes the effect of a collision (the DMRS being punctured in an SRS transmission candidate subframe) between the uplink transmission of an NB-IoT terminal that transmits repetitions at the symbol level and the SRS transmission of an existing LTE terminal in an environment that accommodates the coexistence of LTE terminals and NB-IoT terminals. With this arrangement, by performing channel estimation and symbol level combining using a sufficient number of DMRS symbols in the demodulation of a signal from an NB-IoT terminal, the base station is able to improve the channel estimation accuracy and the received signal quality.

Hereinafter, exemplary embodiments of the present disclosure will be described in detail and with reference to the drawings.

[Overview of Communication System]

The communication system according to each embodiment of the present disclosure is provided with a base station 100 and a terminal 200. The terminal 200 is an NB-IoT terminal, for example. Also, in the communication system, an environment is supposed in which NB-IoT terminals (the terminal 200) and existing LTE terminals coexist.

Figure 8:
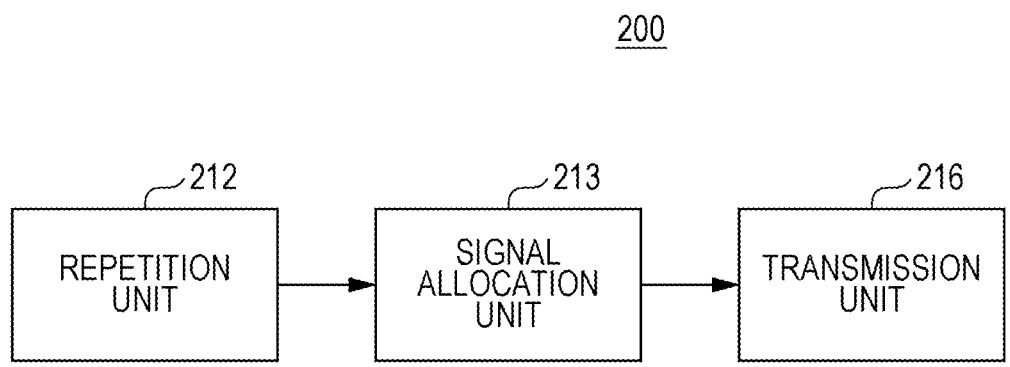
FIG. 8 is a block diagram illustrating a principal configuration of a terminal according to Embodiment 1.

FIG. 8 is a block diagram illustrating the principal configuration of the terminal 200 according to each embodiment of the present disclosure. In the terminal 200 illustrated in FIG. 8, a repetition unit 212 repeats a data signal and the demodulation reference signal (DMRS) at the symbol level over a plurality of subframes. A signal allocation unit 213 maps, in the a plurality of subframes, the repeated DMRS to a symbol other than a symbol corresponding to an SRS resource candidate, which is a candidate for a resource to which the sounding reference signal (SRS) used to measure the uplink received signal quality is to be mapped. A transmission unit 216 transmits the uplink signal (PUSCH) including the DMRS and the data signal in the a plurality of subframes.

Embodiment 1

[Base Station Configuration]

Figure 9:
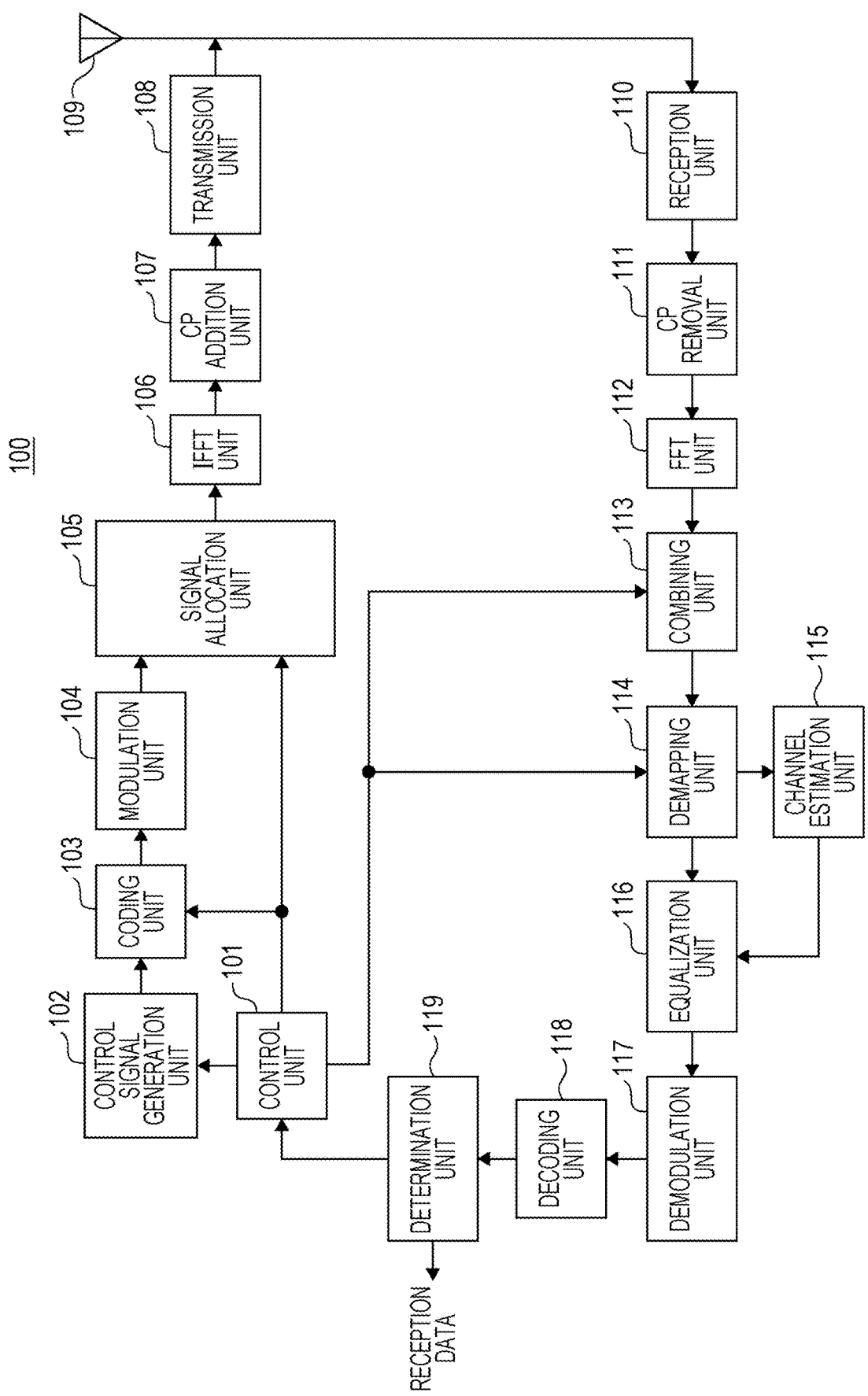
FIG. 9 is a block diagram illustrating a configuration of a base station according to Embodiment 1.

FIG. 9 is a block diagram illustrating a configuration of the base station 100 according to Embodiment 1 of the present disclosure. In FIG. 9, the base station 100 includes a control unit 101, a control signal generation unit 102, a coding unit 103, a modulation unit 104, a signal allocation unit 105, an inverse fast Fourier transform (IFFT) unit 106, a cyclic prefix (CP) addition unit 107, a transmission unit 108, an antenna 109, a reception unit 110, a CP removal unit 111, a fast Fourier transform (FFT) unit 112, a combining unit 113, a demapping unit 114, a channel estimation unit 115, an equalization unit 116, a demodulation unit 117, a decoding unit 118, and a determination unit 119.

The control unit 101 decides an SRS resource candidate group in a cell while accounting for the amounts of SRS resources needed by each of the a plurality of terminals (existing LTE terminals) existing in the cell covered by the base station 100, and outputs information indicating the decided SRS resource candidate group to the control signal generation unit 102 and the combining unit 113. The SRS resource candidate group is selected from the table illustrated in FIG. 2, for example.

Also, the control unit 101 outputs, to the combining unit 113 and the demapping unit 114, information related to the mapping of the DMRS and data to SC-FDMA symbols when the NB-IoT terminal (the terminal 200) transmits by repetition.

In addition, the control unit 101 decides the allocation of the PUSCH with respect to the NB-IoT terminal. At this time, the control unit 101 decides the frequency allocation resources, the modulation/coding scheme, and the like to indicate to the NB-IoT terminal, and outputs information related to the decided parameters to the control signal generation unit 102.

Also, the control unit 101 decides the coding level for a control signal, and outputs the decided coding level to the coding unit 103. Also, the control unit 101 decides the radio resources (downlink resources) that the control signal is to be mapped to, and outputs information related to the decided radio resources to the signal allocation unit 105.

In addition, the control unit 101 decides a coverage enhancement level of the NB-IoT terminal, and outputs information related to the decided coverage enhancement level, or a repetition count required for PUSCH transmission at the decided coverage enhancement level, to the control signal generation unit 102. Also, the control unit 101 generates information related to the number of subcarriers to be used for PUSCH transmission by the NB-IoT terminal, and outputs the generated information to the control signal generation unit 102.

The control signal generation unit 102 generates a control signal directed at the NB-IoT terminal. The control signal includes a cell-specific higher-layer signal, a terminal-specific higher-layer signal, or an uplink grant indicating the allocation of the PUSCH.

The uplink grant contains a plurality of bits, and includes information indicating frequency allocation resources, the modulation/coding scheme, and the like. Additionally, the uplink grant may also include information related to a coverage enhancement level or a number of repetitions required for PUSCH transmission, and information related to the number of subcarriers to be used for PUSCH transmission by the NB-IoT terminal.

The control signal generation unit 102 uses the control information input from the control unit 101 to generate a control information bit sequence, and outputs the generated control information bit sequence (control signal) to the coding unit 103. Note that since the control information may also be transmitted to a plurality of NB-IoT terminals, the control signal generation unit 102 generates bit sequences that include the terminal ID of each NB-IoT terminal in the control information directed at each NB-IoT terminal. For example, cyclic redundancy check (CRC) bits masked by the terminal ID of the destination terminal are added to the control information.

In addition, information about the SRS resource candidate group is reported to the NB-IoT terminal (a control unit 206 described later) by the cell-specific higher-layer signaling. Information indicating the frequency allocation resources and the modulation/coding scheme, information related to the coverage enhancement level or the number of repetitions required for PUSCH transmission, and information related to the number of subcarriers to be used for PUSCH transmission by the NB-IoT terminal may also be reported to the NB-IoT terminal by terminal-specific higher-layer signaling, or by using the uplink grant indicating the allocation of the PUSCH as described above.

The coding unit 103, following the indicated coding level from the control unit 101, codes the control signal (control information bit sequence) received from the control signal generation unit 102, and outputs the coded control signal to the modulation unit 104.

The modulation unit 104 modulates the control signal received from the coding unit 103, and outputs the modulated control signal (symbol sequence) to the signal allocation unit 105.

The signal allocation unit 105 maps the control signal (symbol sequence) received from the modulation unit 104 to the radio resources indicated by the control unit 101. Note that the control channel on which the control signal is to be mapped is the downlink control channel for NB-IoT. The signal allocation unit 105 outputs a downlink subframe signal, including the NB-IoT downlink control channel to which the control signal is mapped, to the IFFT unit 106.

The IFFT unit 106 performs an IFFT process on the signal received from the signal allocation unit 105, thereby transforming a frequency-domain signal to a time-domain signal. The IFFT unit 106 outputs the time-domain signal to the CP addition unit 107.

The CP addition unit 107 adds a CP to the signal received from the IFFT unit 106, and outputs the signal with the added CP (an OFDM signal) to the transmission unit 108.

The transmission unit 108 performs radio-frequency (RF) processing such as digital-to-analog (D/A) conversion and upconversion on the OFDM signal received from the CP addition unit 107, and transmits a radio signal to the NB-IoT terminal (terminal 200) via the antenna 109.

The reception unit 110 performs RF processing such as downconversion and analog-to-digital (A/D) conversion on an uplink signal (PUSCH) from the terminal 200 received via the antenna 109, and outputs the obtained received signal to the CP removal unit 111. The uplink signal (PUSCH) transmitted from the terminal 200 includes a signal that is repeated over a plurality of subframes.

The CP removal unit 111 removes the CP added to the received signal received from the reception unit 110, and outputs the signal with the CP removed to the FFT unit 112.

The FFT unit 112 applies an FFT process to the signal received from the CP removal unit 111, decomposes the signal into a signal sequence in the frequency domain, extracts the signals corresponding to the PUSCH subframes, and outputs the extracted PUSCH signals to the combining unit 113.

The combining unit 113 uses the information related to the SRS resource candidate group and information related to PUSCH repetition transmitted by the NB-IoT terminal (information related to the number of repetitions and the mapping of the DMRS and data to SC-FDMA symbols when the NB-IoT transmits by repetition) input from the control unit 101 to perform symbol level combining of the PUSCH transmitted by repetition over a plurality of subframes, and coherently combines the signals of the portion corresponding to the data signal and the DMRS.

The combining unit 113 outputs the combined signal to the demapping unit 114.

The demapping unit 114 extracts the signal of the PUSCH subframe portion from the signal received from the combining unit 113. Subsequently, the demapping unit 114 uses information related to the PUSCH repetition transmission by the NB-IoT terminal input from the control unit 101, decomposes the extracted signal of the PUSCH subframe portion into SC-FDMA data symbols and the DMRS, and outputs the DMRS to the channel estimation unit 115, while outputting the SC-FDMA data symbols to the equalization unit 116.

The channel estimation unit 115 performs channel estimation using the DMRS input from the demapping unit 114. The channel estimation unit 115 outputs the obtained channel estimation values to the equalization unit 116.

The equalization unit 116 uses the channel estimation values input from the channel estimation unit 115 to perform equalization of the SC-FDMA data symbols input from the demapping unit 114. The equalization unit 116 outputs the equalized SC-FDMA data symbols to the demodulation unit 117.

The demodulation unit 117 applies the inverse discrete Fourier transform (IDFT) to the frequency-domain SC-FDMA data symbols input from the equalization unit 116, and after transformation to a time-domain signal, performs data demodulation. Specifically, the demodulation unit 117 converts a symbol sequence into a bit sequence on the basis of a modulation scheme indicated to the NB-IoT terminal, and outputs the obtained bit sequence to the decoding unit 118.

The decoding unit 118 performs error-correction decoding on the bit sequence input from the demodulation unit 117, and outputs the decoded bit sequence to the determination unit 119.

The determination unit 119 performs error detection on the bit sequence input from the decoding unit 118. The determination unit 119 performs error detection using the CRC bits added to the bit sequence. If the determination result of the CRC bits is error-free, the determination unit 119 retrieves the received data, and reports an ACK to the control unit 101. On the other hand, if the determination result of the CRC bits returns an error, the determination unit 119 reports a NACK to the control unit 101.

[Terminal Configuration]

Figure 10:
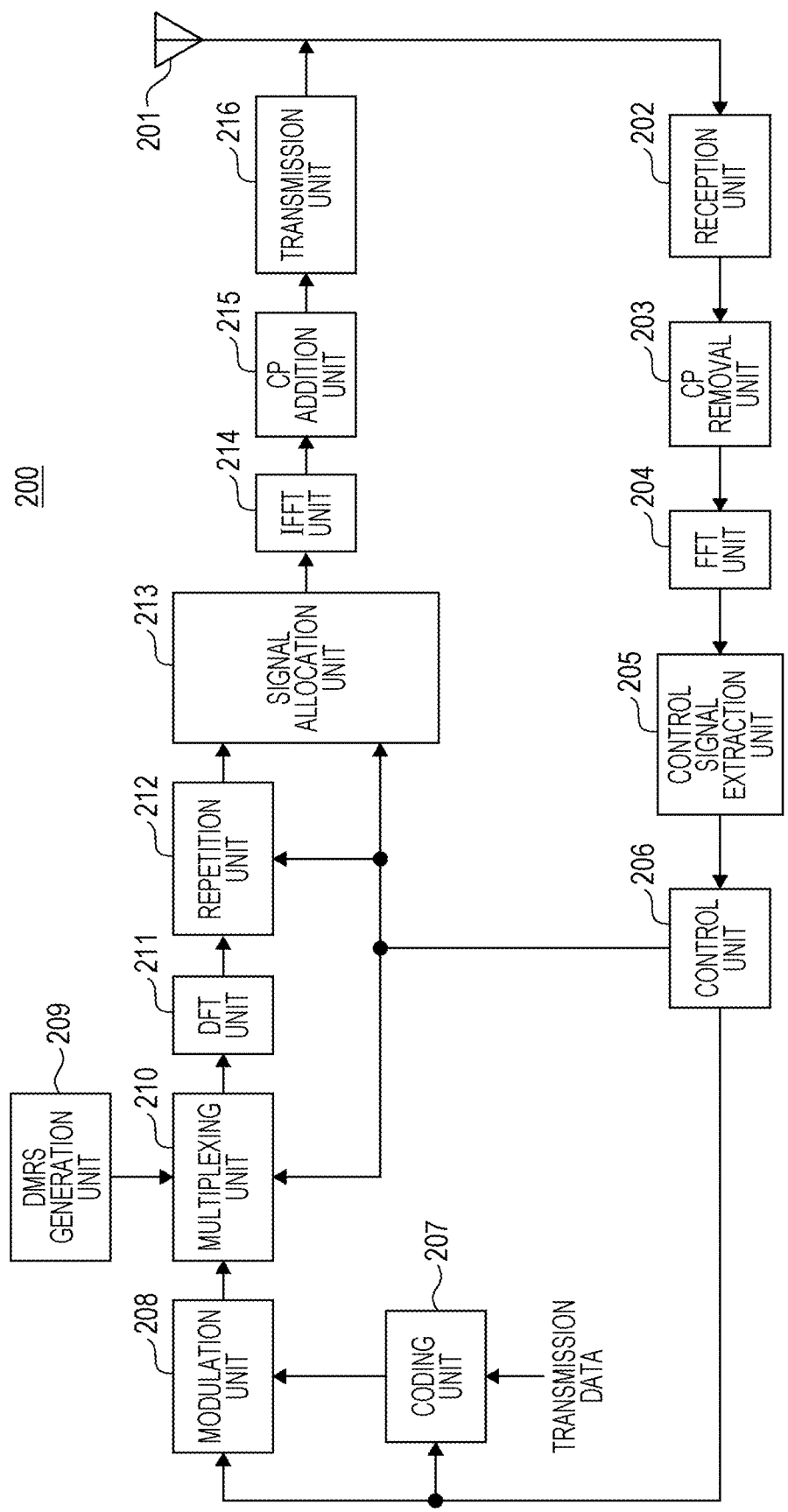
FIG. 10 is a block diagram illustrating a configuration of the terminal according to Embodiment 1.

FIG. 10 is a block diagram illustrating a configuration of the terminal 200 according to Embodiment 1 of the present disclosure. In FIG. 10, the terminal 200 includes an antenna 201, a reception unit 202, a CP removal unit 203, an FFT unit 204, a control signal extraction unit 205, a control unit 206, a coding unit 207, a modulation unit 208, a DMRS generation unit 209, a multiplexing unit 210, a DFT unit 211, a repetition unit 212, a signal allocation unit 213, an IFFT unit 214, a CP addition unit 215, and a transmission unit 216.

The reception unit 202 receives the control signal (downlink control channel for NB-IoT) transmitted from the base station 100 via the antenna 201, performs RF processing such as downconversion and AD conversion on the received radio signal, and obtains a baseband OFDM signal. The reception unit 202 outputs the OFDM signal to the CP removal unit 203.

The CP removal unit 203 removes the CP added to the OFDM signal received from the reception unit 202, and outputs the signal with the CP removed to the FFT unit 204.

The FFT unit 204 performs an FFT process on the signal received from the CP removal unit 203, thereby transforming a time-domain signal to a frequency-domain signal. The FFT unit 204 outputs the frequency-domain signal to the control signal extraction unit 205.

The control signal extraction unit 205 performs blind decoding on the frequency-domain signal (downlink control channel for NB-IoT) received from the FFT unit 204, and attempts to decode a control signal addressed to oneself. The control signal addressed to the terminal 200 includes an added CRC masked by the terminal ID of the NB-IoT terminal. Consequently, if the CRC determination is OK as a result of the blind decoding, the control signal extraction unit 205 extracts and outputs the control information to the control unit 206.

The control unit 206 controls PUSCH transmission on the basis of the control signal input from the control signal extraction unit 205.

Specifically, the control unit 206 indicates resource allocation for PUSCH transmission to the signal allocation unit 213 on the basis of PUSCH resource allocation information included in the control signal.

Also, on the basis of information about the coding scheme and the modulation scheme included in the control signal, the control unit 206 indicates the coding scheme and the modulation scheme for PUSCH transmission to the coding unit 207 and the modulation unit 208, respectively. Also, in the case in which information related to a coverage enhancement level or information related to the number of repetitions required for PUSCH transmission is included in the control signal, on the basis of the information, the control unit 206 decides the number of repetitions for PUSCH repetition transmission, and indicates information expressing the decided number of repetitions to the repetition unit 212. Also, in the case in which information related to the number of subcarriers to be used for PUSCH transmission by the NB-IoT terminal is included in the control signal, on the basis of the information, the control unit 206 indicates the number of subcarriers and the number X of subframes per resource unit for PUSCH transmission to the signal allocation unit 213.

Also, in the case in which information related to the coverage enhancement level, information related to the number of repetitions required for PUSCH transmission, or information related to the coding scheme and modulation scheme is reported from the base station 100 in a higher layer, on the basis of the reported information, the control unit 206 decides the number of repetitions for PUSCH repetition transmission or the coding scheme and modulation scheme, and indicates the decided information to the repetition unit 212, or to the coding unit 207 and the modulation unit 208. Similarly, in the case in which information related to the number of subcarriers to be used for PUSCH transmission by the NB-IoT terminal is reported from the base station 100 in a higher layer, on the basis of the reported information, the control unit 206 indicates the number of subcarriers and the number X of subframes per resource unit for PUSCH transmission to the signal allocation unit 213.

Also, the control unit 206 outputs information related to the SRS resource candidate group reported from the base station 100 in a cell-specific higher layer to the signal allocation unit 213.

Also, the control unit 206 outputs information related to the mapping of the DMRS and data to SC-FDMA symbols when the NB-IoT terminal transmits by repetition to the multiplexing unit 210, the repetition unit 212, and the signal allocation unit 213.

The coding unit 207 adds CRC bits masked by the terminal ID t the input transmission data, performs error-correction coding according to the coding scheme indicated from the control unit 206, and outputs a coded bit sequence to the modulation unit 208.

The modulation unit 208 modulates the bit sequence received from the coding unit 207 on the basis of the modulation scheme indicated from the control unit 206, and outputs a modulated data symbol sequence to the multiplexing unit 210.

The DMRS generation unit 209 generates the DMRS, and outputs the generated DMRS to the multiplexing unit 210.

On the basis of the information related to the mapping of the DMRS and data to SC-FDMA symbols input from the control unit 206, the multiplexing unit 210 multiplexes the data symbol sequence received from the modulation unit 208 and the DMRS received from the DMRS generation unit 209, and outputs a multiplexed signal to the DFT unit 211.

The DFT unit 211 applies the DFT to the signal input from the multiplexing unit 210 to generate and output a frequency-domain signal to the repetition unit 212.

In the case in which the local terminal is in a coverage enhancement mode, on the basis of the number of repetitions indicated from the control unit 206, the repetition unit 212 repeats the signal input from the DFT unit 211 over a plurality of subframes, and generates a repetition signal. The repetition unit 212 outputs the repetition signal to the signal allocation unit 213.

The signal allocation unit 213 maps the signal received from the repetition unit 212 to PUSCH time/frequency resources allocated in accordance with the indication from the control unit 206. Also, on the basis of the information related to the SRS resource candidate group received from the control unit 206, the signal allocation unit 213 punctures the signal mapped to the symbols corresponding to the SRS resource candidates of the SRS transmission candidate subframes. The signal allocation unit 213 outputs the signal-mapped PUSCH signal to the IFFT unit 214.

The IFFT unit 214 performs an IFFT process on the frequency-domain PUSCH signal input from the signal allocation unit 213, and thereby generates a time-domain signal. The IFFT unit 214 outputs the generated signal to the CP addition unit 215.

The CP addition unit 215 adds a CP to the time-domain signal received from the IFFT unit 214, and outputs the signal with the added CP to the transmission unit 216.

The transmission unit 216 performs RF processing such as D/A conversion and upconversion on the signal received from the CP addition unit 215, and transmits a radio signal to the base station 100 via the antenna 201.

[Operations of Base Station 100 and Terminal 200]

Operations in the base station 100 and the terminal 200 having the above configurations will be described in detail.

The base station 100 reports the srs-SubframeConfig to the terminal 200 as a cell-specific higher-layer indication that sets the SRS resource candidate group.

Also, communication is performed by having the base station 100 allocate resource units inside the NB-IoT band to the NB-IoT terminal, namely the terminal 200.

In addition, the base station 100 decides the allocation of the PUSCH with respect to the NB-IoT terminal. PUSCH allocation information includes frequency allocation resource information to indicate to the NB-IoT terminal, information related to the coding scheme and the modulation scheme, and the like. The PUSCH allocation information may be reported from the base station 100 to the terminal 200 through a terminal-specific higher layer, or by using the downlink control channel for NB-IoT.

Also, before transmitting and receiving the PUSCH, the base station 100 indicates the number of repetitions (R) to the NB-IoT terminal in advance. The number of repetitions (R) may be indicated from the base station 100 to the terminal 200 through a terminal-specific higher layer, or by using the downlink control channel for NBIoT.

Also, before transmitting and receiving the PUSCH, the base station 100 indicates the number of transmission subcarriers (for example, 1, 3, 6, or 12 subcarriers) to be used for PUSCH transmission by the NB-IoT terminal to the NB-IoT terminal in advance. The number of transmission subcarriers may be indicated from the base station 100 to the terminal 200 through a terminal-specific higher layer, or by using the downlink control channel for NB-IoT.

The terminal 200 decides the number X of subframes per resource unit on the basis of the indicated number of subcarriers. For example, in the case in which the number of transmission subcarriers is 1, 3, 6, or 12, the terminal 200 decides the number of subframes per resource unit to be X=8, 4, 2, or 1, respectively.

Also, the terminal 200 transmits the PUSCH by repetition, for the number of repetitions (R) reported from the base station 100. Consequently, the terminal 200 transmits the PUSCH over (X×R) subframes. For example, if the number of SC-FDMA symbols per subframe is the same 14 symbols as existing LTE systems, in (X×R) subframes, (14×X×R) SC-FDMA symbols are included.

Also, the terminal 200 transmits the PUSCH using repetition at the symbol level. At this time, the terminal 200 maps all DMRS included in the repetition signal (PUSCH signal) consecutively from the beginning symbol of the a plurality of subframes in which to perform the PUSCH repetition. Specifically, the terminal 200 maps the DMRS consecutively over 2R symbols from the beginning of the subframes in which to perform the PUSCH repetition.

Figure 11:
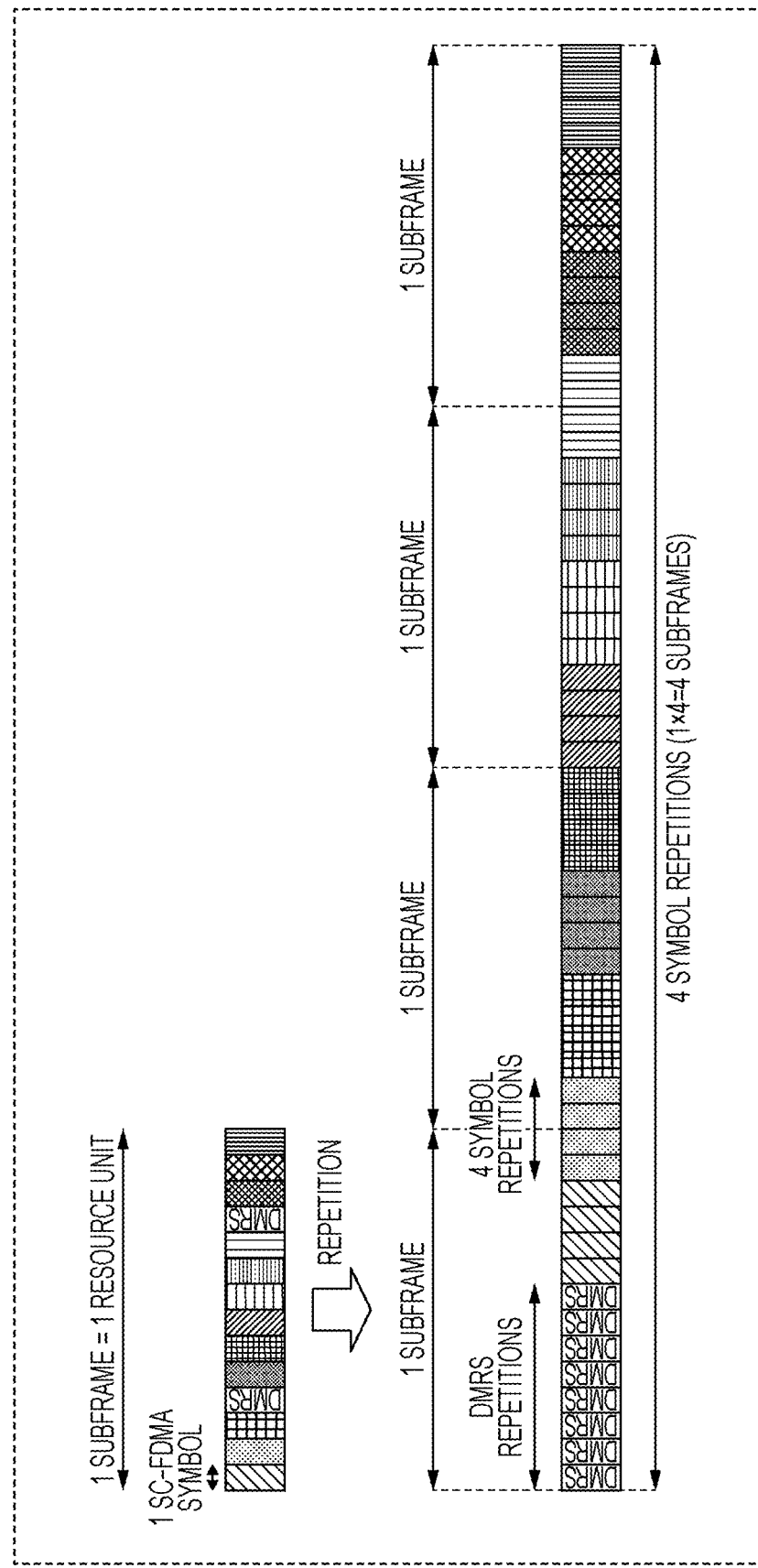
FIG. 11 is a diagram illustrating exemplary operations of PUSCH repetition transmission according to Embodiment 1.

FIG. 11 illustrates how PUSCH repetition is performed in the case of X=1 subframe and R=4 subframes.

As illustrated in FIG. 11, one subframe includes two DMRS, and in the 4 (=X×R) subframes in which the terminal 200 transmits by repetition, 8 (=2R) DMRS are included. Accordingly, in FIG. 11, the terminal 200 maps the DMRS consecutively (hereinafter also called DMRS repetition) over 8 SC-FDMA symbols (=2R) from the beginning of the subframes in which to perform the PUSCH repetition (4-symbol repetition).

Note that in the case in which X>1 (not illustrated), it is sufficient for the terminal 200 to perform the DMRS repetition of 2R symbols on a cycle of R subframes.

Herein, in the case of 2R<14 (the number of SC-FDMA symbols per subframe), or in other words, in the case in which the number of repetitions R is less than (14/2)=7, in the terminal 200, the DMRS is not mapped to the last symbol (the 14th symbol from the beginning) of one subframe. In other words, the terminal 200 maps the DMRS to SC-FDMA symbols other than the last symbol of a subframe (SRS transmission candidate subframe) in which an existing LTE terminal may possibly transmit the SRS.

Also, the terminal 200 specifies the SRS transmission candidate subframes on the basis of the srs-SubframeConfig indicated from the base station 100. Additionally, in the SRS transmission candidate subframes, the terminal 200 punctures the last symbol of the 14 SC-FDMA symbols. As described above, the DMRS is not mapped to the last symbol of a subframe. In other words, a data symbol is always mapped to the last symbol of an SRS transmission candidate subframe. Thus, in the terminal 200, in the last symbol of an SRS transmission candidate subframe, a data symbol rather than the DMRS is punctured.

In so doing, in the case in which the NB-IoT terminal, namely the terminal 200, performs PUSCH repetition at the symbol level, the DMRS is mapped to SC-FDMA symbols other than the SC-FDMA symbol (the last symbol of an SRS transmission candidate subframe) corresponding to an SRS resource candidate in which an LTE terminal may possibly transmit the SRS.

On the other hand, the base station 100 demodulates the data signal using the DMRS included in the PUSCH transmitted from the terminal 200. As described above, even in the case in which SRS transmission candidate subframes are included among the subframes in which PUSCH repetition is performed by the NB-IoT terminal, the DMRS is not punctured in the NB-IoT terminal. Thus, the base station 100 is able to perform channel estimation and symbol level combining using a sufficient number of DMRS symbols for the received PUSCH.

Also, in FIG. 11, since all DMRS symbols are mapped consecutively from the beginning symbol of the a plurality of subframes in which the PUSCH repetition is performed, compared to the case of simply expanding the mapping of the data signal and the DMRS of an existing LTE system (FIG. 7), the base station 100 is able to perform symbol level combining using twice as many DMRS. Thus, according to the present embodiment, the base station 100 is able to improve the channel estimation accuracy.

Also, since a known signal, namely the DMRS, is mapped consecutively at the beginning of the subframes in which the PUSCH repetition is performed, the base station 100 is able to perform frequency error estimation and timing detection accurately.

Also, as described above, by controlling the mapping of the DMRS in the NB-IoT terminal, the puncturing of the DMRS is avoided. In other words, according to the present embodiment, in the base station 100, it is not necessary to change the SRS subframe settings with respect to the existing LTE system.

According to the above, in the present embodiment, it is possible to improve the transmission quality for NB-IoT terminals while minimizing the impact on an existing LTE system.

Embodiment 2

Embodiment 1 describes a method of avoiding collisions between the SRS transmission of an existing LTE terminal and the DMRS transmission of an NB-IoT terminal in the case in which the number of repetitions R<7. In contrast, the present embodiment describes a method of avoiding collisions between the SRS transmission of an existing LTE terminal and the DMRS transmission of an NB-IoT terminal even in the case in which the number of repetitions R>7. In other words, the present embodiment describes a method in which the DMRS is not mapped to the last symbol of a subframe, regardless of the value of the number of repetitions R.

Note that the base station and the terminal according to the present embodiment share the basic configurations of the base station 100 and the terminal 200 according to Embodiment 1, and thus will be described by citing FIGS. 9 and 10.

The base station 100 indicates the srs-SubframeConfig to the terminal 200 as a cell-specific higher-layer indication that sets the SRS resource candidate group. Also, communication is performed by having the base station 100 allocate resource units inside the NB-IoT band to the NB-IoT terminal, namely the terminal 200.

In addition, the base station 100 decides the allocation of the PUSCH with respect to the NB-IoT terminal. PUSCH allocation information includes frequency allocation resource information to indicate to the NB-IoT terminal, information related to the coding scheme and the modulation scheme, and the like. The PUSCH allocation information may be indicated from the base station 100 to the terminal 200 through a terminal-specific higher layer, or by using the downlink control channel for NB-IoT.

Also, before transmitting and receiving the PUSCH, the base station 100 indicates the number of repetitions (R) to the NB-IoT terminal in advance. The number of repetitions (R) may be indicated from the base station 100 to the terminal 200 through a terminal-specific higher layer, or by using the downlink control channel for NBIoT.

Also, before transmitting and receiving the PUSCH, the base station 100 indicates the number of transmission subcarriers (for example, 1, 3, 6, or 12 subcarriers) to be used for PUSCH transmission by the NB-IoT terminal to the NB-IoT terminal in advance. The number of transmission subcarriers may be indicated from the base station 100 to the terminal 200 through a terminal-specific higher layer, or by using the downlink control channel for NB-IoT.

Also, the base station 100 decides a number of DMRS partitions (N) or a number of symbol repetitions (R') that expresses the number of DMRS symbols to transmit consecutively with respect to the NB-IoT terminal. The number of DMRS partitions (N) or the number of symbol repetitions (R') may be indicated from the base station 100 to the terminal 200 through a terminal-specific higher layer, or by using the downlink control channel for NB-IoT. Also, the number of DMRS partitions (N) or the number of symbol repetitions (R') may be predefined parameters stipulated by a standard.

The terminal 200 decides the number X of subframes per resource unit on the basis of the indicated number of subcarriers. For example, in the case in which the number of transmission subcarriers is 1, 3, 6, or 12, the terminal 200 decides the number of subframes per resource unit to be X=8, 4, 2, or 1, respectively.

Also, the terminal 200 transmits the PUSCH by repetition, for the number of repetitions (R) indicated from the base station 100. Consequently, the terminal 200 transmits the PUSCH over (X×R) subframes. For example, if the number of SC-FDMA symbols per subframe is the same 14 symbols as existing LTE systems, in (X×R) subframes, (14×X×R) SC-FDMA symbols are included.

Also, the terminal 200 transmits the PUSCH using repetition at the symbol level. At this time, the terminal 200 maps the a plurality of DMRS included in the repetition signal (PUSCH signal) distributed every certain number (R') of consecutive symbols (divided into N groups). Specifically, the terminal 200 performs the consecutive DMRS mapping (DMRS repetition) of (2R/N) symbols on a period of R/N subframes from the beginning of the a plurality of subframes in which to perform the PUSCH repetition.

For example, the terminal 200 maps the DMRS consecutively over (2R/N) symbols from the beginning symbol of the a plurality of subframes in which to perform the PUSCH repetition, and thereafter maps the DMRS over (2R/N) symbols on a period of (R/N) subframes. In other words, the terminal 200 maps the DMRS consecutively over R' symbols at the beginning of the PUSCH repetition subframes, and thereafter maps the DMRS over R' symbols on a period of (R'/2) subframes.

Figure 12:
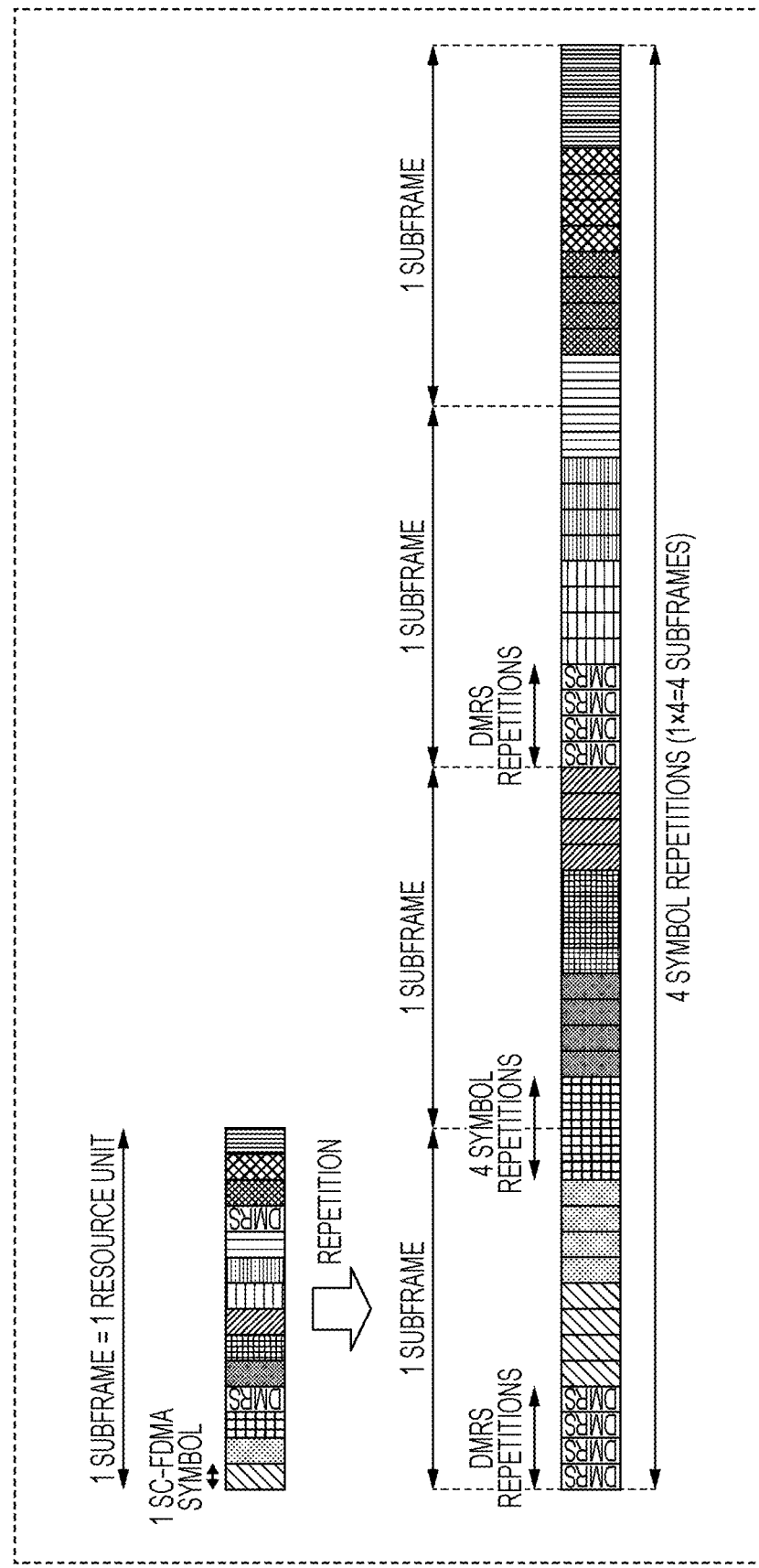
FIG. 12 is a diagram illustrating exemplary operations of PUSCH repetition transmission according to Embodiment 2.

FIG. 12 illustrates how PUSCH repetition is performed in the case of X=1 subframe, R=4 subframes, and N=2 (or R'=4).

As illustrated in FIG. 12, one subframe includes two DMRS, and in the 4 (=X×R) subframes in which the terminal 200 transmits by repetition, 8 (=2R) DMRS are included.

In FIG. 12, the terminal 200 maps the DMRS consecutively over 4 symbols (=2R/N or =R') from the beginning of the subframes in which to perform the PUSCH repetition (4 symbol repetition). Furthermore, the terminal 200 maps the DMRS consecutively over 4 symbols from the beginning of the 3rd subframe after 2 subframes (=R/N or R'/2) from the beginning subframe in which to perform the PUSCH repetition.

Herein, in the case in which N>R/7 or R'<14, in the terminal 200, the DMRS is not mapped to the last symbol of a subframe. In other words, the terminal 200 maps the DMRS to SC-FDMA symbols other than the last symbol of a subframe (SRS transmission candidate subframe) in which an existing LTE terminal may possibly transmit the SRS.

Also, the terminal 200 specifies the SRS transmission candidate subframes on the basis of the srs-SubframeConfig indicated from the base station 100. Additionally, in the SRS transmission candidate subframes, the terminal 200 punctures the last symbol of the 14 SC-FDMA symbols. As described above, the DMRS is not mapped to the last symbol of a subframe. In other words, a data symbol is always mapped to the last symbol of an SRS transmission candidate subframe. Thus, in the terminal 200, in the last symbol of an SRS transmission candidate subframe, a data symbol rather than the DMRS is punctured.

In so doing, in the case in which the NB-IoT terminal, namely the terminal 200, performs PUSCH repetition at the symbol level, similarly to Embodiment 1, the DMRS is mapped to SC-FDMA symbols other than the SC-FDMA symbol (the last symbol of an SRS transmission candidate subframe) corresponding to an SRS resource candidate in which an LTE terminal may possibly transmit the SRS.

On the other hand, the base station 100 demodulates the data signal using the DMRS included in the PUSCH transmitted from the terminal 200. As described above, even in the case in which SRS transmission candidate subframes are included among the subframes in which PUSCH repetition is performed by the NB-IoT terminal, the DMRS is not punctured in the NB-IoT terminal. Thus, the base station 100 is able to perform channel estimation and symbol level combining using a sufficient number of DMRS symbols for the received PUSCH.

Also, in FIG. 12, since a certain number (R') of DMRS symbols are mapped consecutively, by appropriately setting the number of partitions N or the number of repetitions R', an improvement in the received signal power of the DMRS by symbol level combining is obtained.

Also, in the present embodiment, as illustrated in FIG. 12, since the DMRS is distributed in the time domain, it becomes possible to track channel fluctuations and compensate for frequency error. Thus, according to the present embodiment, the channel estimation accuracy may be improved.

Also, in FIG. 12, since a known signal, namely the DMRS, is mapped consecutively at the beginning of the signal in which the PUSCH repetition is performed, the base station 100 is able to perform frequency error estimation and timing detection accurately.

Also, as described above, by controlling the mapping of the DMRS in the NB-IoT terminal, the puncturing of the DMRS is avoided. In other words, according to the present embodiment, in the base station 100, it is not necessary to change the SRS subframe settings with respect to the existing LTE system.

According to the above, in the present embodiment, it is possible to improve the transmission quality for NB-IoT terminals while minimizing the impact on an existing LTE system.

Note that although the present embodiment describes the case of starting the DMRS repetition from the beginning of the PUSCH repetition as one example, the start position of the DMRS repetition is not limited to the beginning of the PUSCH repetition. For example, the terminal 200 may also add an offset in subframe units or slot units to the start position of the DMRS repetition.

Even in the case of adding an offset in subframe units to the start position of the DMRS repetition, if N<R/7 or R'<14, similarly to FIG. 12, the DMRS is not mapped to the last symbol of a subframe.

Also, in the case of adding an offset in slot units (let A be the offset value) to the start position of the DMRS repetition, if N>2R/(14−Δ) or R'<14−Δ, the DMRS is not mapped to the last symbol of a subframe.

Embodiment 3

Embodiments 1 and 2 anticipate a case in which the NB-IoT terminal punctures the last symbol of the 14 SC- FDMA symbols in the SRS transmission candidate subframes. In this case, provided that X is the number of subframes per resource unit, and R is the number of repetitions, the NB-IoT terminal transmits the PUSCH over (X×R) subframes, regardless of whether or not a subframe is an SRS transmission candidate subframe or the number of SRS transmission candidate subframes in the PUSCH transmission segment.

In other words, the transmission time required for the PUSCH repetition is fixed. However, in Embodiments 1 and 2, although the puncturing of the DMRS symbols is avoided, data symbols are punctured. Thus, there is a possibility that degradation of signal characteristics may occur due to the loss of data symbols, particularly in the case of a small number of repetitions.

Accordingly, the present embodiment describes a method of preventing DMRS symbols and data symbols from being punctured in the SRS transmission candidate subframes by allowing the transmission time required for the PUSCH repetition to be different depending on whether or not a subframe is an SRS transmission candidate subframe or the number of SRS transmission candidate subframes in the PUSCH transmission segment.

The base station and the terminal according to the present embodiment share the basic configurations of the base station 100 and the terminal 200 according to Embodiment 1, and thus will be described by citing FIGS. 9 and 10.

The base station 100 indicates the srs-SubframeConfig to the terminal 200 as a cell-specific higher-layer indication that sets the SRS resource candidate group. Also, communication is performed by having the base station 100 allocate resource units inside the NB-IoT band to the NB-IoT terminal, namely the terminal 200.

In addition, the base station 100 decides the allocation of the PUSCH with respect to the NB-IoT terminal. PUSCH allocation information includes frequency allocation resource information to indicate to the NB-IoT terminal, information related to the coding scheme and the modulation scheme, and the like. The PUSCH allocation information may be indicated from the base station 100 to the terminal 200 through a terminal-specific higher layer, or by using the downlink control channel for NB-IoT.

Also, before transmitting and receiving the PUSCH, the base station 100 indicates the number of repetitions (R) to the NB-IoT terminal in advance. The number of repetitions (R) may be indicated from the base station 100 to the terminal 200 through a terminal-specific higher layer, or by using the downlink control channel for NBIoT.

Also, before transmitting and receiving the PUSCH, the base station 100 indicates the number of transmission subcarriers (for example, 1, 3, 6, or 12 subcarriers) to be used for PUSCH transmission by the NB-IoT terminal to the NB-IoT terminal in advance. The number of transmission subcarriers may be indicated from the base station 100 to the terminal 200 through a terminal-specific higher layer, or by using the downlink control channel for NB-IoT.

The terminal 200 decides the number X of subframes per resource unit on the basis of the indicated number of subcarriers. For example, in the case in which the number of transmission subcarriers is 1, 3, 6, or 12, the terminal 200 decides the number of subframes per resource unit to be X=8, 4, 2, or 1, respectively.

Also, the terminal 200 specifies the SRS transmission candidate subframes on the basis of the srs-SubframeConfig indicated from the base station 100.

Also, the terminal 200 transmits the PUSCH by repetition, for the number of repetitions (R) indicated from the base station 100. At this time, the terminal 200 transmits the PUSCH using repetition at the symbol level. During the PUSCH repetition transmission, the terminal 200 does not map the DMRS and the data symbols to the last symbol corresponding to an SRS resource candidate among the 14 SC-FDMA symbols in the SRS transmission candidate subframes. In other words, the terminal 200 maps the DMRS and data symbols to symbols other than the last symbol of the 14 SC-FDMA symbols in the SRS transmission candidate subframes.

In other words, the terminal 200 delays the transmission of the PUSCH signal after the last symbol of an SRS transmission candidate subframe, with the amount of delay being equal to the last symbol (the amount by which the PUSCH signal is not mapped).

In this way, the terminal 200, does not transmit a signal (DMRS or data) in the last symbol of an SRS transmission candidate subframe. In other words, the terminal 200 does not puncture any of the DMRS signals or data symbols.

Figure 13:
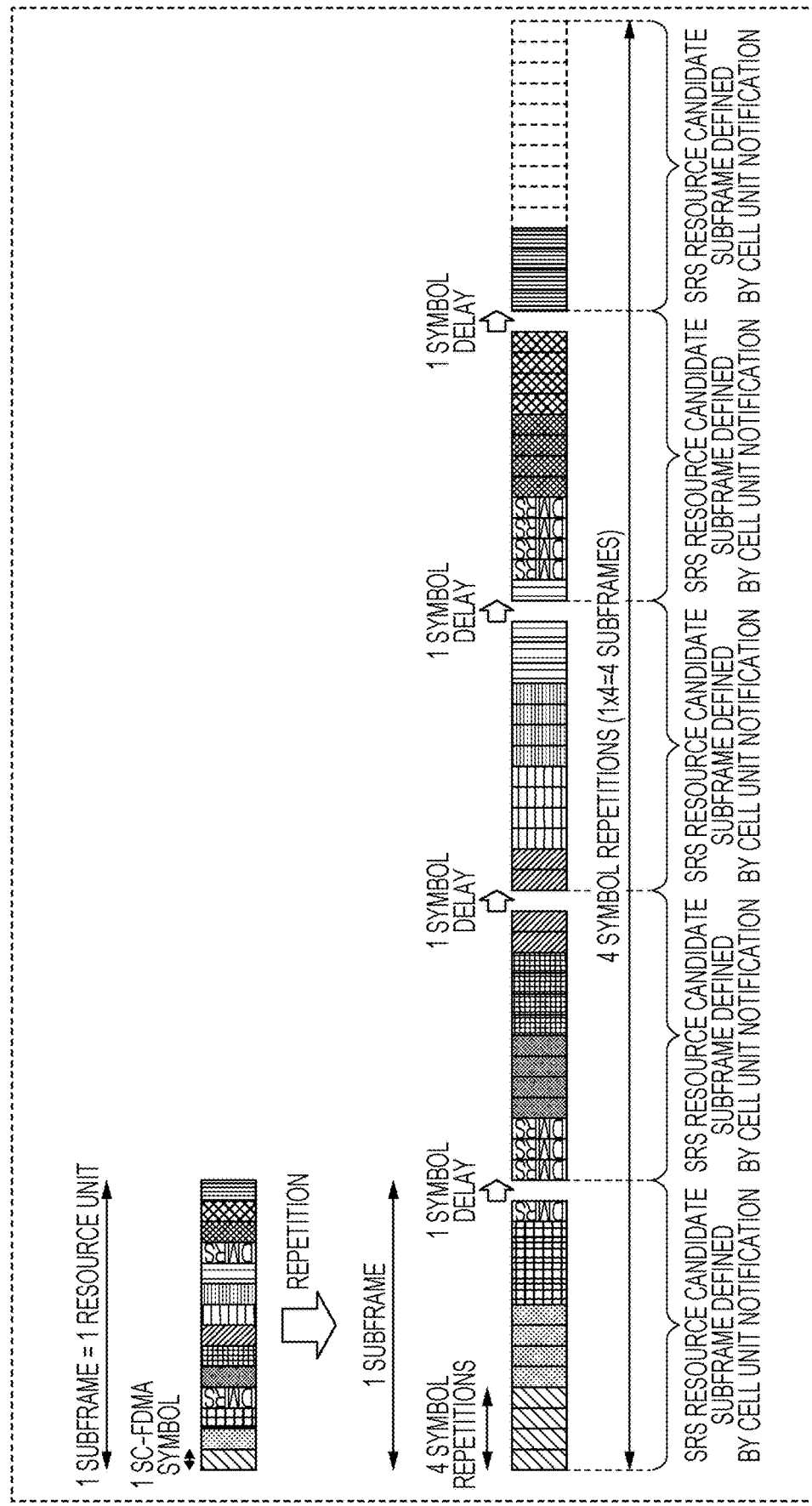
FIG. 13 is a diagram illustrating exemplary operations of PUSCH repetition transmission according to Embodiment 3.

FIG. 13 illustrates how PUSCH repetition is performed in the case of X=1 subframe and R=4 subframes. Also, in FIG. 13, srs-SubframeConfig=0, or in other words, the SRS transmission candidate subframes exist on a 1 ms period (see FIG. 2).

As illustrated in FIG. 13, the terminal 200 performs symbol level repetition of each SC-FDMA symbol included in one resource unit (X=1). In other words, similarly to FIG. 7, the terminal 200 consecutively maps SC-FDMA symbols including the same signals (DMRS symbols and data symbols).

However, the terminal 200 does not transmit a signal in the last symbol (the symbol corresponding to an SRS resource candidate) in SRS transmission candidate subframes, and instead delays by one symbol the SC-FDMA symbols to be transmitted after the SC-FDMA symbol.

With this arrangement, as illustrated in FIG. 13, in the terminal 200, the DMRS and data symbols are not mapped to the last symbol of a subframe. In other words, the terminal 200 does not transmit the DMRS and data symbols in the last symbol of a subframe (SRS transmission candidate subframe) in which an existing LTE terminal may possibly transmit the SRS. In other words, the terminal 200 does not puncture the DMRS and data symbols in the SRS transmission candidate subframes.

Note that, provided that $N_{SRS}$ is the number of SRS transmission candidate subframes in the PUSCH repetition, the terminal 200 performs the PUSCH repetition transmission using (14×X×R+$N_{SRS}$) SC-FDMA symbols. In other words, the terminal 200 performs the PUSCH repetition transmission using ceiling((14×X×R+$N_{SRS}$)/14) subframes. Herein, the function ceiling(X) expresses a ceiling function that returns the smallest integer equal to or greater than x. For example, in FIG. 13, since X=1, R=4, and $N_{SRS}$=4, in the PUSCH repetition transmission, a delay of 4 SC-FDMA symbols occurs, and 5 subframes are used.

In so doing, in the case in which the NB-IoT terminal, namely the terminal 200, performs PUSCH repetition at the symbol level, similarly to Embodiment 1, the DMRS and the data signal are mapped to SC-FDMA symbols other than the SC-FDMA symbol (the last symbol of an SRS transmission candidate subframe) corresponding to an SRS resource candidate in which an LTE terminal may possibly transmit the SRS.

On the other hand, the base station 100 demodulates the data signal using the DMRS included in the PUSCH transmitted from the terminal 200. As described above, in the case in which SRS transmission candidate subframes are included among the subframes in which PUSCH repetition is performed by the NB-IoT terminal, the base station 100 judges that the signal from the NB-IoT terminal is not mapped to the last symbol of an SRS transmission candidate subframe, and is being transmitted with a 1-symbol delay.

With this arrangement, loss due to puncturing in the terminal 200 may be avoided for not only the DMRS but also data symbols. Thus, in the present embodiment, the base station 100 is able to improve the channel estimation and the received signal quality for the received PUSCH. Thus, in the present embodiment, it is possible to improve the transmission quality for NB-IoT terminals while minimizing the impact on an existing LTE system.

Note that in the present embodiment, the method of mapping data and the DMRS to SC-FDMA symbols is arbitrary. Also, in the present embodiment, unlike Embodiment 1 or 2, since data symbols are also not punctured, the received signal quality at the base station 100 does not depend on the number of SRS transmission candidate subframes.

The above thus describes exemplary embodiments of the present disclosure.

Note that the values of the number of repetitions, the value of the parameter X, the number of partitions (N), the number of symbol repetitions (R'), and the values of the parameters defined in the srs-SubframeConfig are merely examples, and are not limited to the above.

Also, although the foregoing embodiments are described by taking the case of configuring an aspect of the present disclosure by hardware as an example, it is also possible to realize the present disclosure by software in conjunction with hardware.

In addition, each function block used in the description of the foregoing embodiments typically is realized as an integrated circuit, that is, an LSI chip. The integrated circuit controls each function block used in the description of the foregoing embodiments, and may be provided with inputs and outputs. The function blocks may be realized individually as separate chips, or as a single chip that includes some or all function blocks. Although LSI is discussed herein, the circuit integration methodology may also be referred to as IC, system LSI, super LSI, or ultra LSI, depending on the degree of integration.

Furthermore, the circuit integration methodology is not limited to LSI, and may be also be realized with special-purpose circuits or general-purpose processors. A field-programmable gate array (FPGA) capable of being programmed after fabrication of the LSI chip, or a reconfigurable processor whose circuit cell connections and settings inside the LSI chip may be reconfigured, may also be used.

Furthermore, if circuit integration technology that may be substituted for LSI appears as a result of progress in semiconductor technology or another derived technology, obviously the new technology may be used to integrate the function blocks. Biotechnology applications and the like are also a possibility.

A terminal of the present disclosure adopts a configuration including: a repetition unit that performs a repetition for mapping a data signal and a demodulation reference signal (DMRS) repeatedly at a symbol level over a plurality of subframes; a signal allocation unit that maps, in the a plurality of subframes, the repeated DMRS to symbols other than symbols corresponding to an SRS resource candidate, which is a candidate for a resource to which a sounding reference signal (SRS) used to measure an uplink received signal quality is to be mapped; and a transmission unit that transmits an uplink signal including the DMRS and the data signal in the a plurality of subframes.

In a terminal of the present disclosure, the signal allocation unit maps all of the DMRS included in the uplink signal consecutively from a beginning symbol of the a plurality of subframes, and punctures the data signal mapped to symbols corresponding to the SRS resource candidate.

In a terminal of the present disclosure, the signal allocation unit maps a plurality of DMRS included in the uplink signal distributed every certain number of consecutive symbols, and punctures the data signal mapped to symbols corresponding to the SRS resource candidate.

In a terminal of the present disclosure, among the a plurality of subframes, the signal allocation unit maps the DMRS and the data signal to symbols other than symbols corresponding to the SRS resource candidate, and does not map the uplink signal to symbols corresponding to the SRS resource candidate.

A transmission method of the present disclosure includes: performing a repetition for mapping a data signal and a demodulation reference signal (DMRS) repeatedly at a symbol level over a plurality of subframes; mapping, in the a plurality of subframes, the repeated DMRS to symbols other than symbols corresponding to an SRS resource candidate, which is a candidate for a resource to which a sounding reference signal (SRS) used to measure an uplink received signal quality is to be mapped; and transmitting an uplink signal including the DMRS and the data signal in the a plurality of subframes.

An aspect of the present disclosure is useful in a mobile communication system.

REFERENCE SIGNS LIST 100 base station
200 terminal
101, 206 control unit
102 control signal generation unit
103, 207 coding unit
104, 208 modulation unit
105, 213 signal allocation unit
106, 214 IFFT unit
107, 215 CP addition unit
108, 216 transmission unit
109, 201 antenna
110, 202 reception unit
111, 203 CP removal unit
112, 204 FFT unit
113 combining unit
114 demapping unit
115 channel estimation unit
116 equalization unit
117 demodulation unit
118 decoding unit
119 determination unit
205 control signal extraction unit
209 DMRS generation unit
210 multiplexing unit
211 DFT unit
212 repetition unit

The invention claimed is:
1. A communication apparatus, comprising:
a receiver, which, in operation, receives control information indicating a number of symbols on which a Demodulation Reference Signal (DMRS) is to be mapped; and a transmitter, which, in operation, transmits a signal in a multiple consecutive time units, each of the multiple consecutive time units including multiple time slots;

wherein the DMRS is mapped to each of multiple non-consecutive sets in the multiple consecutive time units, a number of symbols in each of the multiple non-consecutive sets being determined based on the control information, the number of symbols of each of the multiple non-consecutive sets is less than 14 symbols regardless of a number of the multiple consecutive time units, the symbols of each of the multiple non-consecutive sets are symbols other than sounding reference signal (SRS) symbol candidates, and a number of the multiple consecutive time units is different for each of numbers of subcarriers to be mapped.

2. The communication apparatus according to claim 1, wherein each of the multiple non-consecutive sets is periodically allocated in multiple consecutive time units.

3. The communication apparatus according to claim 1, wherein the SRS symbol candidates is transmitted via a higher layer signaling.

4. The communication apparatus according to claim 1, wherein the numbers of subcarriers include less than 12 subcarriers.

5. The communication apparatus according to claim 1, wherein the signal is generated without assuming the SRS symbol candidates, and some of the signal relating to the SRS symbol candidates is punctured before transmission.

6. The communication apparatus according to claim 1, wherein a total number of symbols in the multiple non-consecutive sets is determined based on a repetition number of a physical shared uplink channel (PUSCH) and a number of subframes per a resource unit.

7. A communication method, comprising:
receiving control information indicating a number of symbols on which a Demodulation Reference Signal (DMRS) is to be mapped; and transmitting a signal in a multiple consecutive time units, each of the multiple consecutive time units including multiple time slots;

wherein the DMRS is mapped to each of multiple non-consecutive sets in the multiple consecutive time units, a number of symbols in each of the multiple non-consecutive sets being determined based on the control information, the number of symbols of each of the multiple non-consecutive sets is less than 14 symbols regardless of a number of the multiple consecutive time units, the symbols of each of the multiple non-consecutive sets are symbols other than sounding reference signal (SRS) symbol candidates, and a number of the multiple consecutive time units is different for each of numbers of subcarriers to be mapped.

8. The communication method according to claim 7, wherein each of the multiple non-consecutive sets is periodically allocated in multiple consecutive time units.

9. The communication method according to claim 7, wherein the SRS symbol candidates is transmitted via a higher layer signaling.

10. The communication method according to claim 7, wherein the numbers of subcarriers include less than 12 subcarriers.

11. The communication method according to claim 7, wherein the signal is generated without assuming the SRS symbol candidates, and some of the signal relating to the SRS symbol candidates is punctured before transmission.

12. The communication method according to claim 7, wherein a total number of symbols in the multiple non-consecutive sets is determined based on a repetition number of a physical shared uplink channel (PUSCH) and a number of subframes per a resource unit.

* * * * *